Inventor:
Wilhelmus Adrianus van Berkel

By Cheever Cox & Moore
Att'ys.

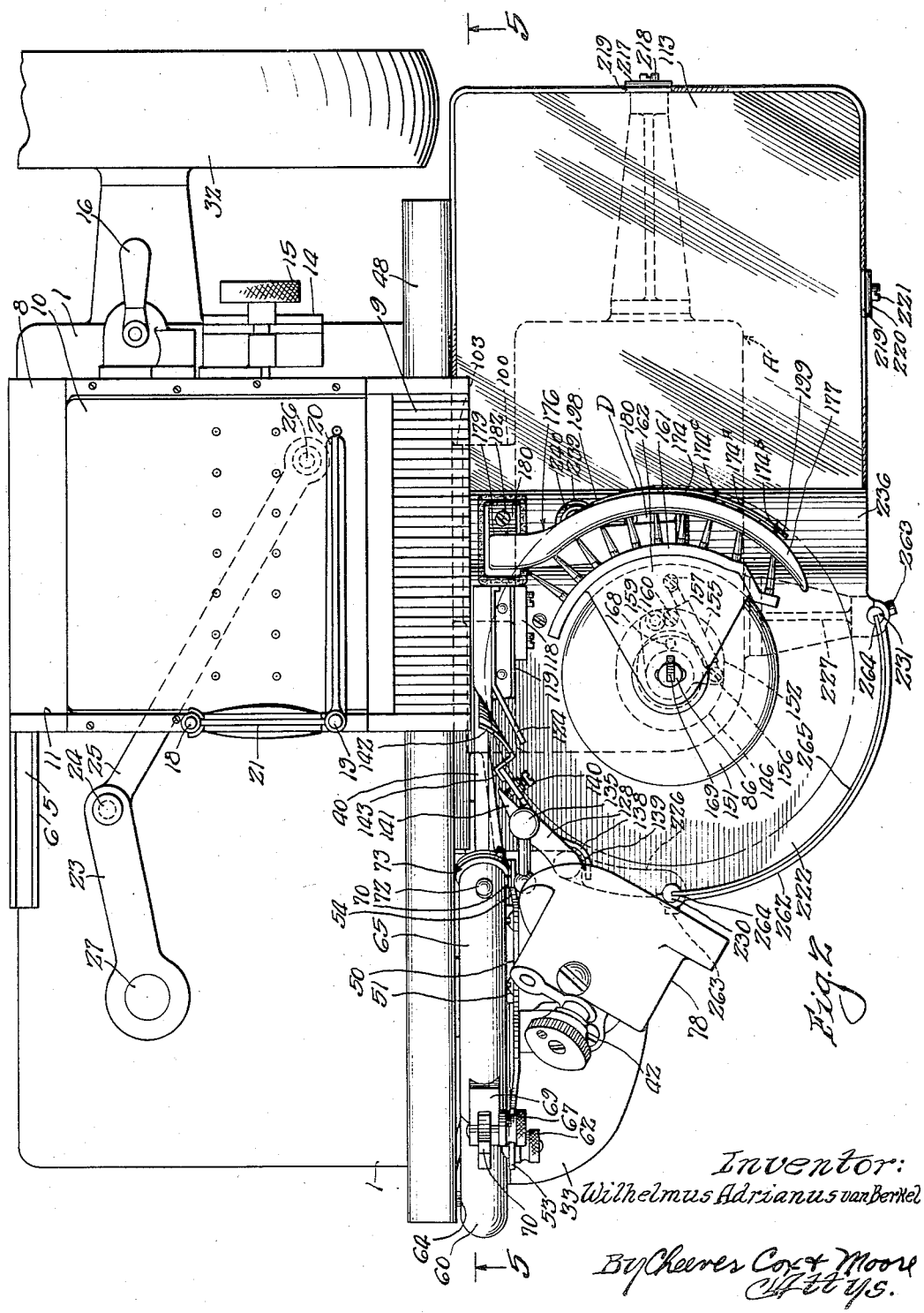

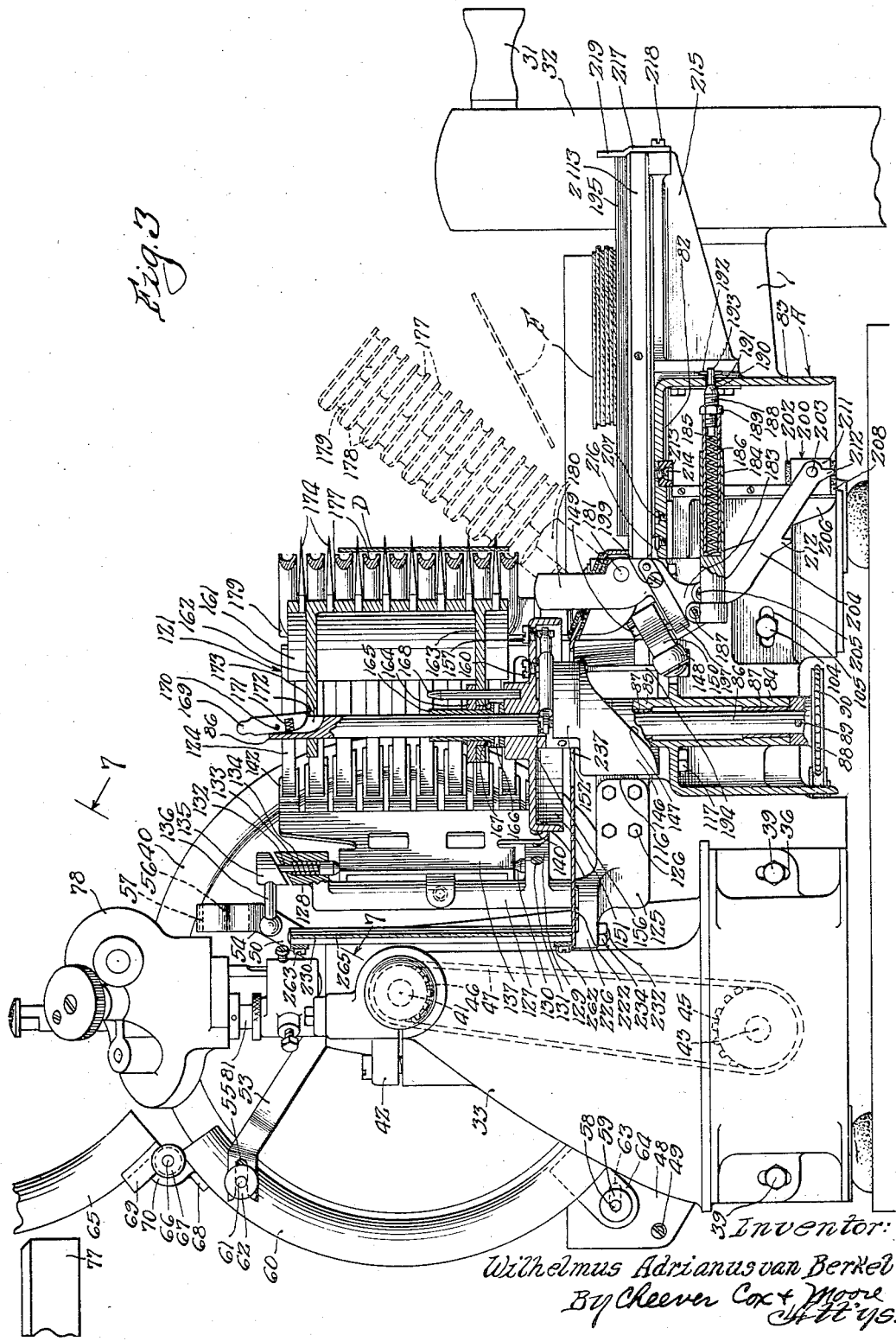

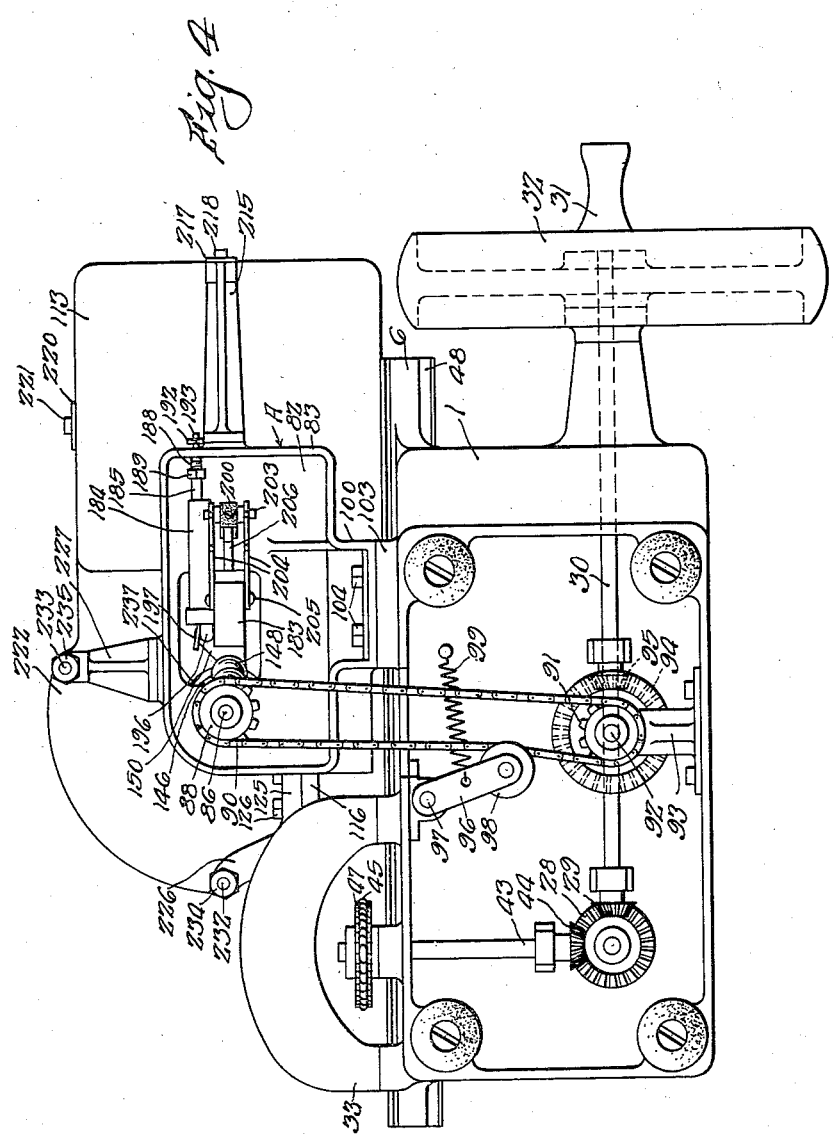

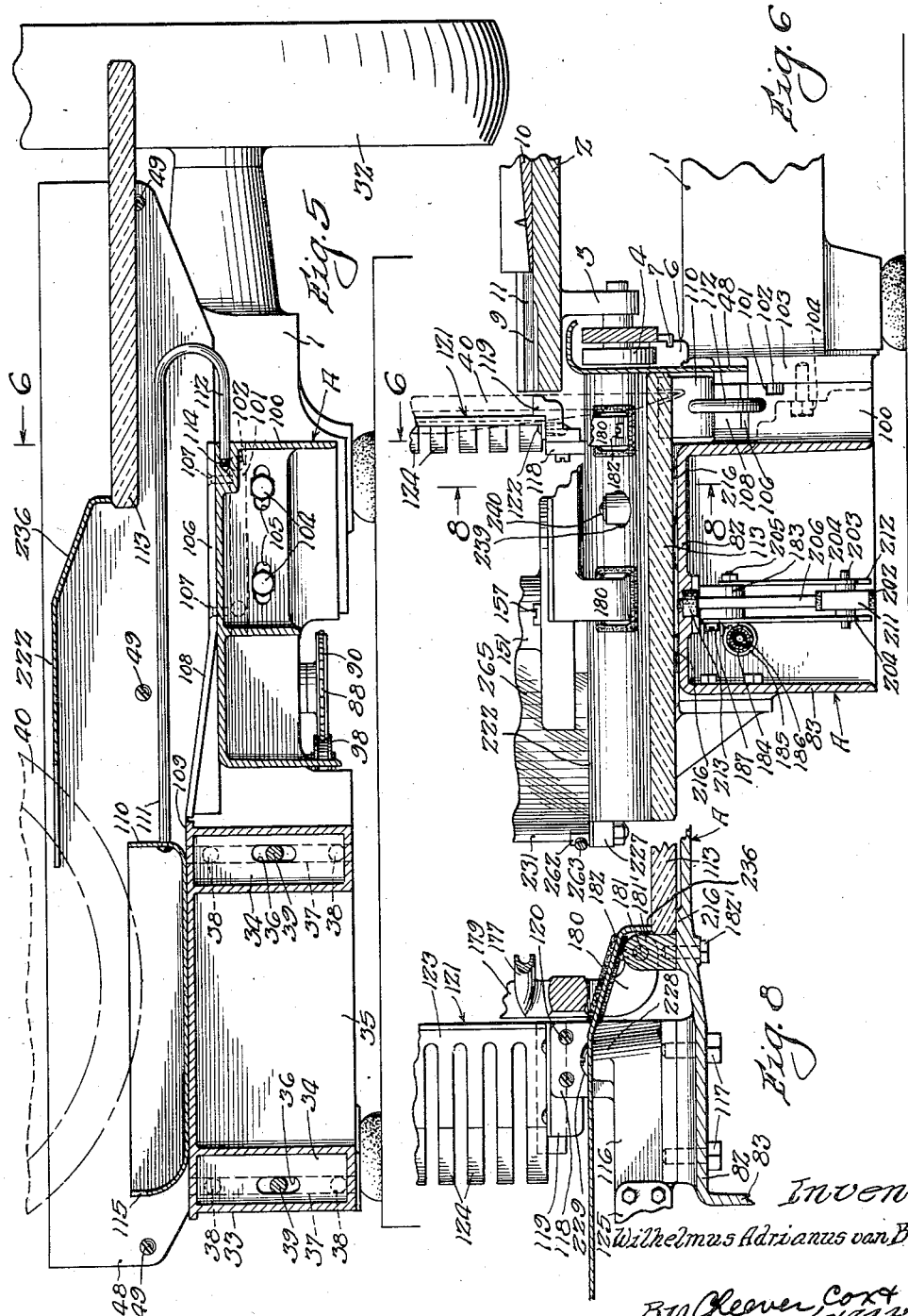

Oct. 16, 1934.  W. A. VAN BERKEL  1,976,863
STACKER FOR SLICING MACHINES
Filed June 27, 1931  10 Sheets-Sheet 6
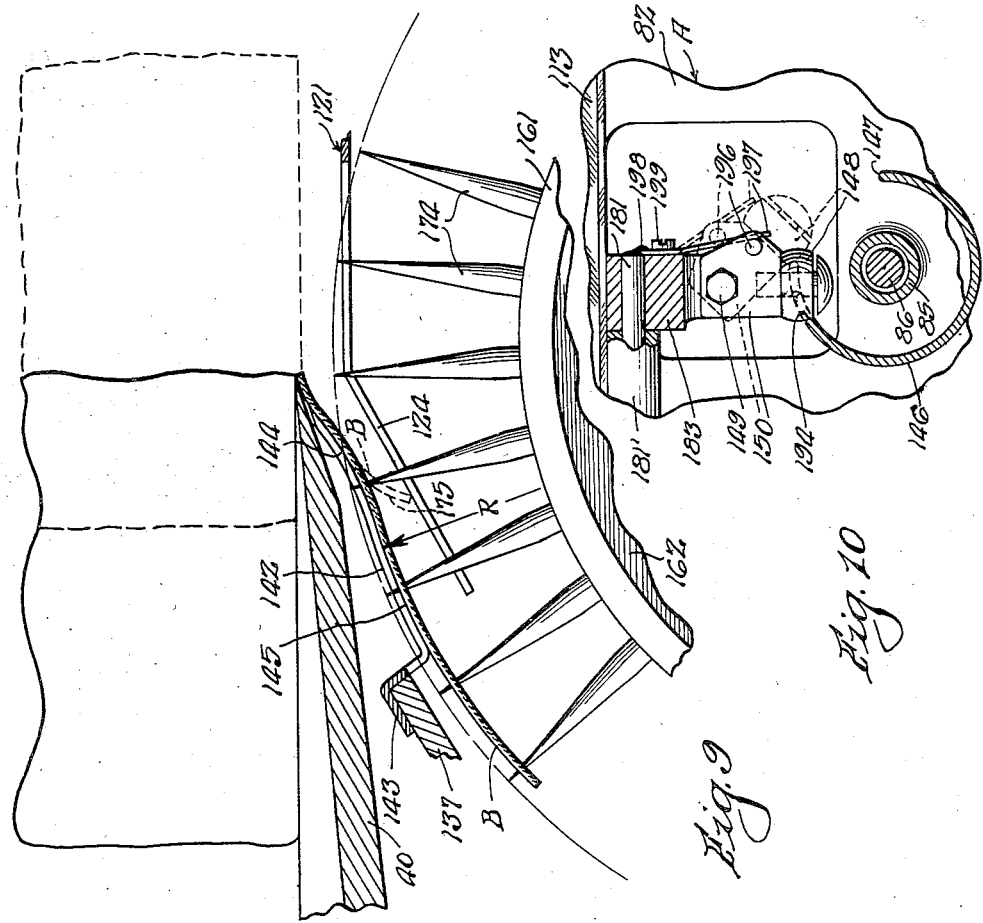
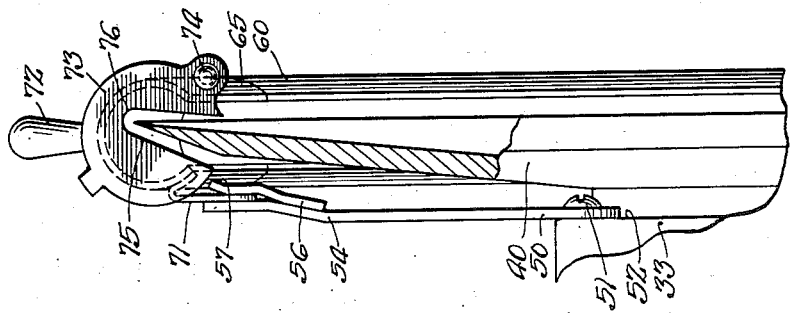
Inventor:
Wilhelmus Adrianus van Berkel
By Cheever Cox + Moore
Att'ys.

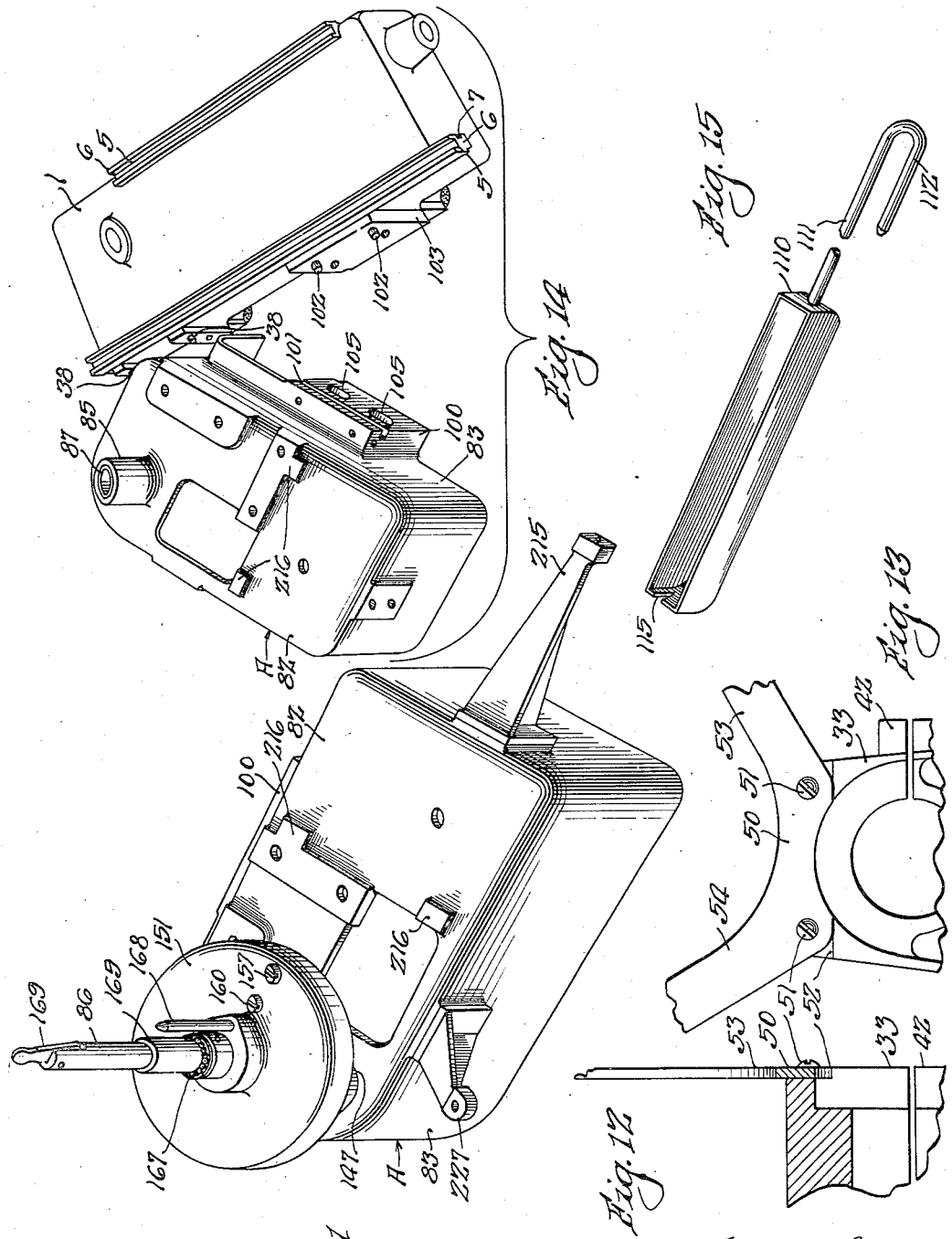

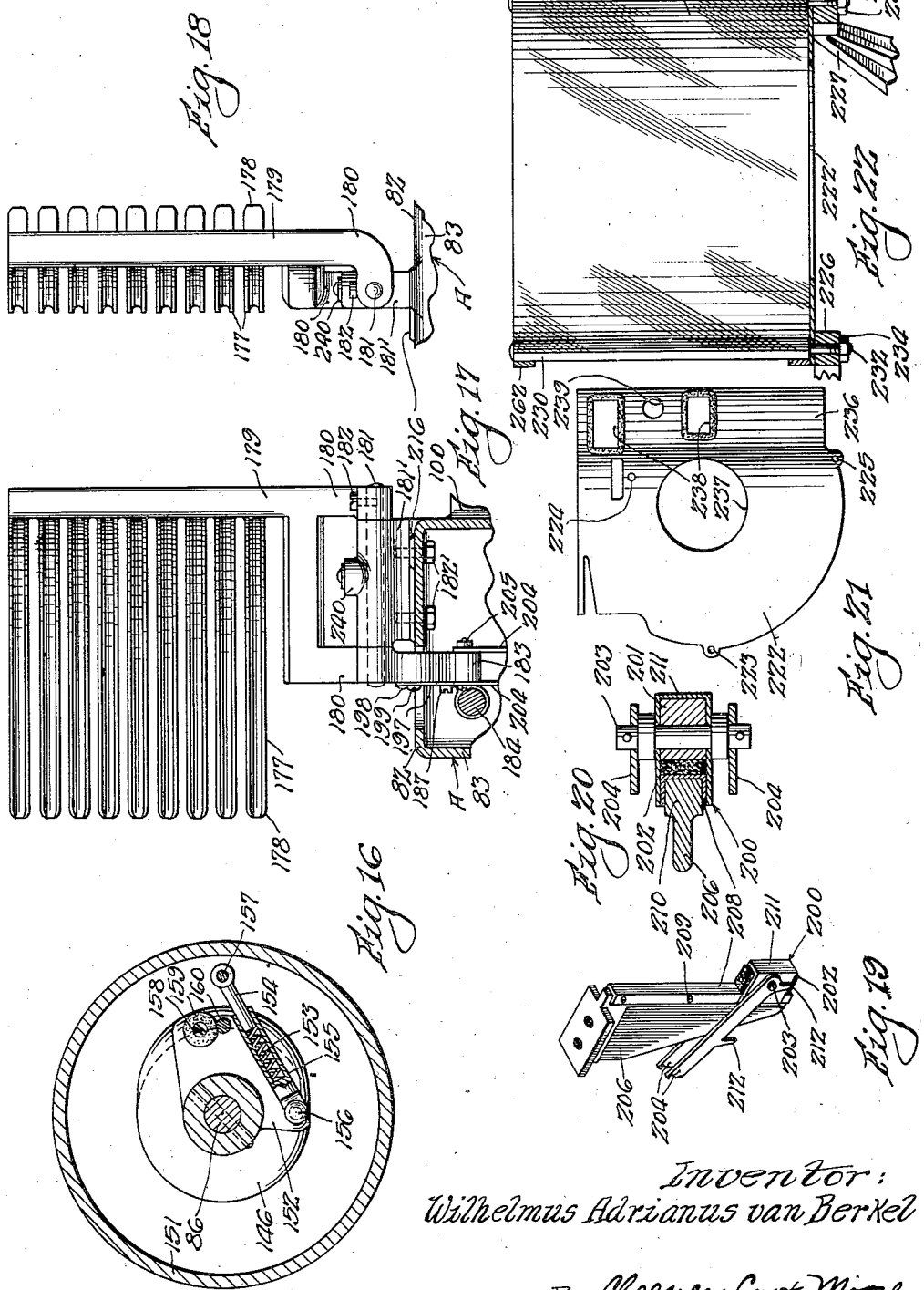

Inventor:
Wilhelmus Adrianus van Berkel
By Cheever Cox & Moore
Att'ys.

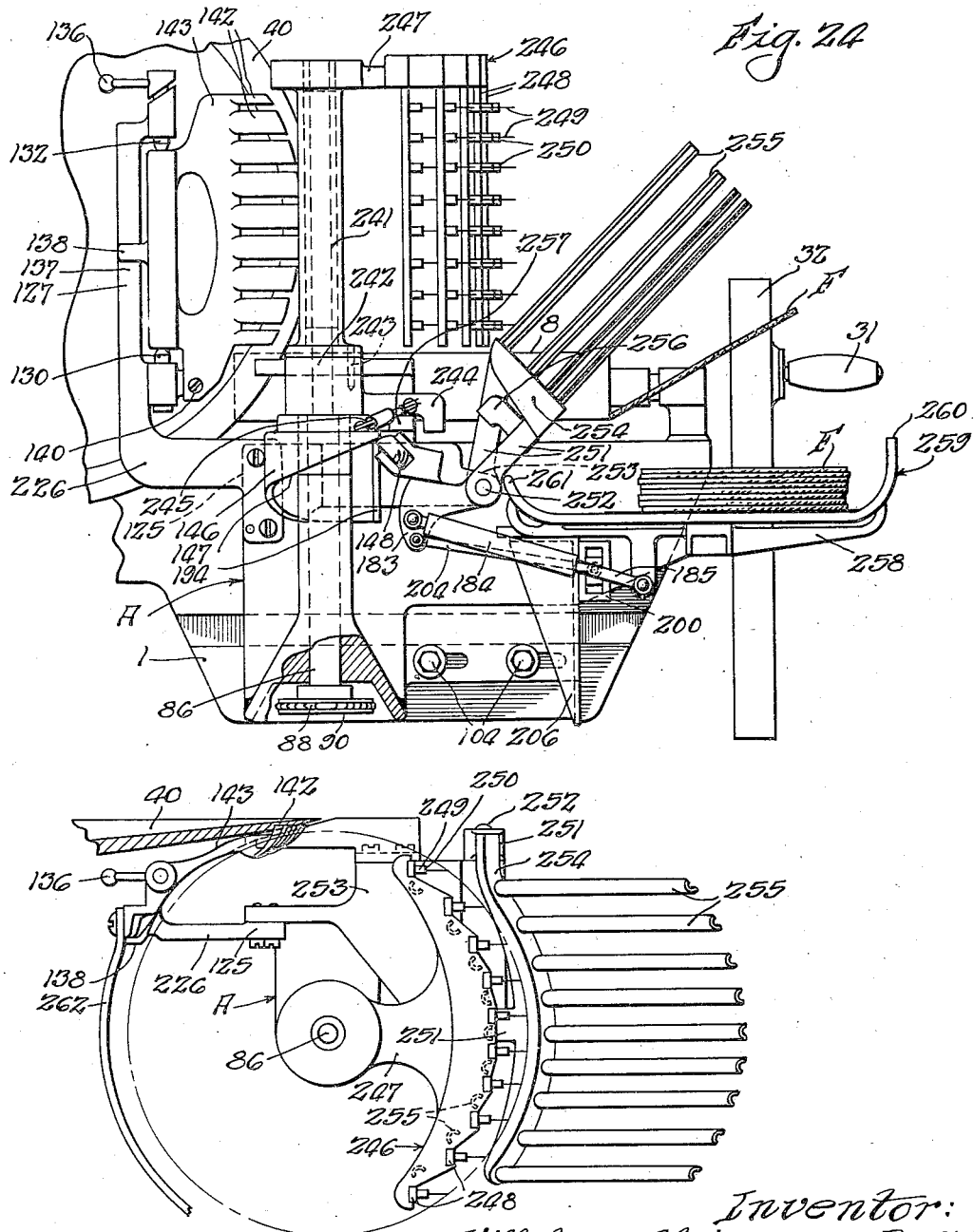

Patented Oct. 16, 1934

1,976,863

UNITED STATES PATENT OFFICE 1,976,863

STACKER FOR SLICING MACHINES

Wilhelmus Adrianus van Berkel, Clarens, Montreux, Switzerland, assignor to U. S. Slicing Machine Company, La Porte, Ind., a corporation of Indiana Application June 27, 1931, Serial No. 547,409 In Great Britain July 1, 1930

39 Claims. (Cl. 146—94)

The present invention relates to slicing machines and particularly to that type of slicing machine which is used in stacking slices without the aid of human hands. More particularly, the invention resides in a novel mechanism for carrying the slices away from the knife after it has been cut thereby and thereafter moving the slice onto a support.

My invention has for one of its objects the provision of means whereby the stacking mechanism is supported upon a bracket which is adjustable as a unit to and from the cutting edge of the knife in a plane parallel to the cutting plane of the knife, or substantially so. This is necessary in view of the fact that the knife, after it has been sharpened a number of times, decreases in diameter, and the stacking mechanism is not in the proper relation to the knife. My invention contemplates moving the slice deflector and stacking mechanism as well as all other associated mechanism used for conveying the slice onto the slice receiving platform, as a unit, thereby necessitating only one adjustment in order to adjust the slice deflector and stacking mechanism when the knife diameter is decreased, or in the event a new knife is substituted for an old knife, and the new knife has a different diameter than that previously used.

Another object of this invention resides in the particular form of slice deflector used to deflect the slices and arrange the slices in the proper relation to the conveying means which conveys the slices away from the substance being sliced after being severed by the knife. Another object of this invention resides in the novel mechanism for releasably holding the slice conveying drum in operative position on the stacking mechanism. The releasable means for releasably holding the slice conveying drum in operative connection to the stacking mechanism is preferably arranged to permit quick removal of the slice conveying drum so that the same may be quickly cleaned and also so that the other parts of the stacking mechanism desired may be more accessible for cleaning purposes.

Another object of this invention resides in the novel form of fly used for moving the slices off the slice conveying drum.

Another object of this invention resides in the novel means for permitting the slice conveying drum to rotate at a different speed than its driving mechanism while the slice is being severed from the substance in order that the slices will not be torn by the prongs on the drum, it being very desirable that the drum rotate at a speed which is proportional to the speed of movement of the table and also the peripheral speed of the drum at the point where the slice is received is substantially the same as the linear speed of the table.

My invention contemplates using a fly which is operated by a cam having an abrupt shoulder at one portion thereof for a purpose to appear hereinafter and a roller contacts with the cam to actuate the fly. If the operating means for the slicing machine were rotated in the opposite direction than that intended, the roller would come against the abrupt shoulder on the cam and perhaps damage the roller or other parts of the mechanism. Therefore an object of this invention is to provide a roller having a yielding mounting which prevents the cam from injuring the roller or the associated mechanism connected thereto in the event that the actuating means for the slicing machine is rotated in the wrong direction.

Another very novel feature of my invention is the means for driving the stacking mechanism from the main drive for the slicing machine and efficiently maintaining the drive to the stacking mechanism regardless of the position to which the stacking mechanism is adjusted.

My invention also embodies a novel form of knife guard which has an adjustment in a plane parallel to the cutting plane of the knife and also has a section which is quickly movable to an inoperative position to permit the knife to be sharpened without increasing the overall length of the space necessarily occupied by the slicing machine. This section, when moved to operative position, is automatically held in operative position over the knife edge to protect the operator and customers from injury by the slicing knife. The guard also embodies novel means for preventing any substantial amount of grease from being thrown outwardly from the knife, and for scraping a portion of the grease which accumulates on the knife from the cutting edge thereof so as to enable the knife to cut the substances with greater effectiveness.

Another object of this invention is to provide novel means for checking the motion of the fly particularly at the end of its throwing movement, or the movement which deposits the slices upon the slice receiving platform, or the paper thereon. In carrying out this invention, I provide novel means whereby when the pivots for the brake and other parts of the mechanism are lubricated, this lubricant cannot drain onto the brake to thereby decrease the efficiency thereof for even the smallest amount of lubricant between the surface of the brake and the surface to which the brake is applied, will destroy entirely the usefulness of the brake as such. I also use a resilient bumper at the end of the travel of the brake to cushion the last part of the movement of the brake if the brake should move slightly more than actually intended. This eliminates noise and also has a tendency to absorb the shock which would otherwise tend to destroy the usefulness of the fly.

I also provide my slicing machine with a novel scrap pan which has novel means for guiding the same into operative position and for locking the same in that position, as well as providing means whereby the operator may quickly remove the scrap pan when desired, even though the same is generally located in an inaccessible position.

Other objects of this invention will appear hereinafter as the description of this invention proceeds, the novel arrangements, features and combinations being clearly set forth in the appended claims.

Another object of my invention is to provide a finger guard positioned by the operator's position and the prongs or stacking mechanism for guarding the operator against injury by the prongs. This finger guard also has means thereon for assisting in guiding the slices onto the prongs and determining their position on said prongs.

Another object of this invention is to utilize a portion of the discharge fly for a guard, the fly being provided with a portion lying outside of the plane of movement of the prongs toward the operator's side of the machine.

In the drawings:

Fig. 2 is a plan view of the slicing machine;

Fig. 3 is an elevational view of the side of the slicing machine with parts thereof broken away and in section for the sake of clearness;

Fig. 4 is a bottom plan view of the apparatus shown in Figs. 1 to 3 inclusive;

Fig. 5 is a section taken along the line 5—5 of Fig. 2;

Fig. 6 is a section taken along the line 6—6 of Fig. 5;

Fig. 7 is a section taken substantially along the line 7—7 of Fig. 3 showing the manner in which the movable portion of the knife guard is releasably held in operative position;

Fig. 8 is a section taken substantially along the line 8—8 of Fig. 6;

Fig. 9 is an enlarged plan view of a portion of the stacking mechanism;

Fig. 10 is a detailed plan view of the cam and roller for actuating the fly;

Fig. 11 is an isometric view of the slidable bracket with the fly, guard plate, receiving plate and drum removed;

Figs. 12 and 13 are detailed views showing the manner in which the guard support is mounted on the chain box;

Fig. 14 is a view showing the bracket and base separated in order to better illustrate the adjustable connection therebetween;

Fig. 15 is a perspective view of the scrap pan;

Fig. 16 is a cross sectional view illustrating the construction of the yieldable connection which connects the stacking drum to the rotatable support therefor as well as illustrating the stop for limiting the rotative movement of the drum in one direction;

Fig. 17 is an elevational view of the fly viewed from the operator's side;

Fig. 18 is an elevational view looking from the left in Fig. 17;

Fig. 19 is a perspective view of the brake for the fly with the protecting cover removed;

Fig. 20 is a horizontal section through the brake;

Fig. 21 is a plan view of the cover plate;

Fig. 22 shows the manner in which the transparent guard plate is carried by the adjustable bracket;

Fig. 24 is a side elevational view of the device shown in Fig. 23;

Fig. 25 is an enlarged fragmentary plan view of a portion of the device shown in Fig. 23 showing the discharge fly in discharge position;

Figure 1:
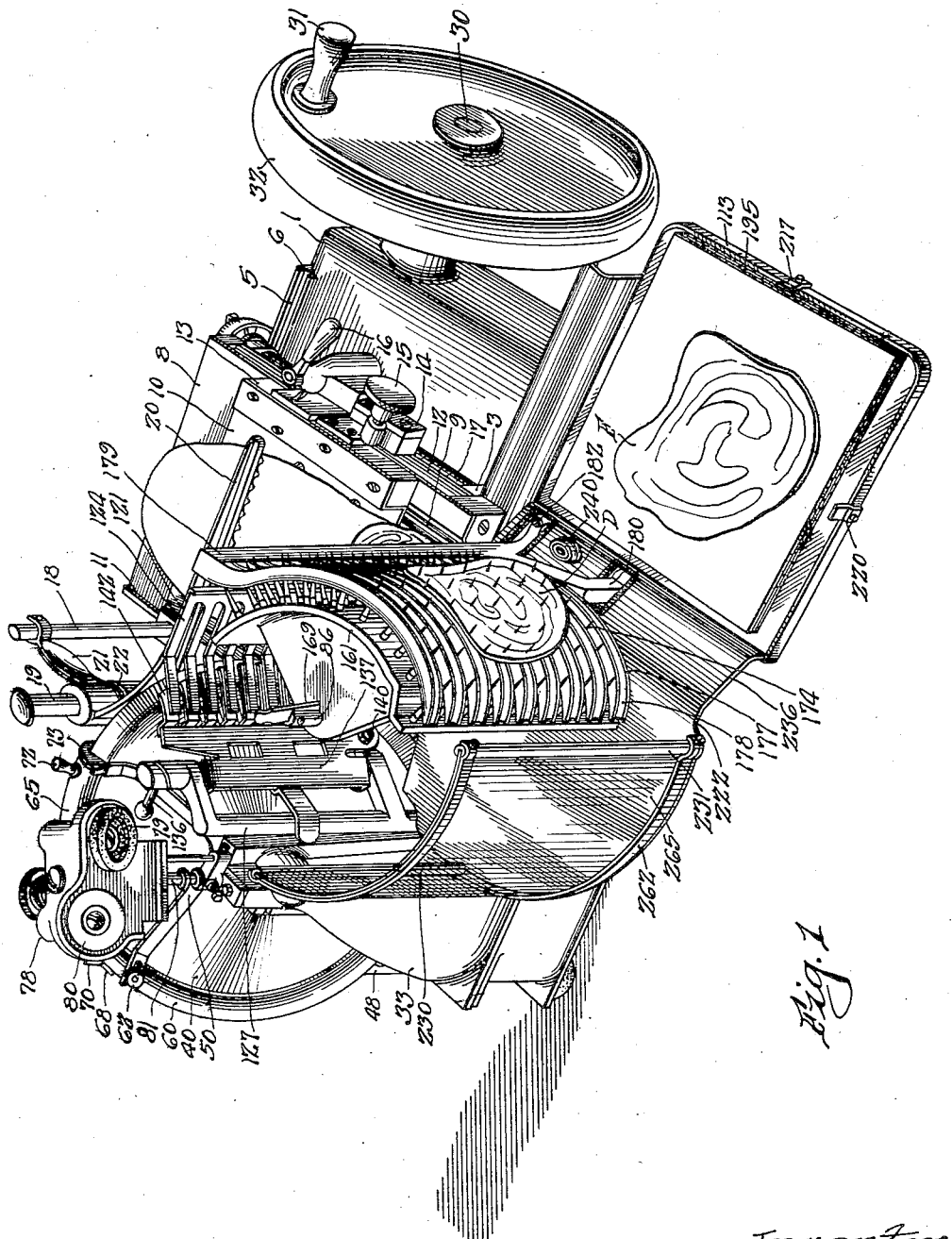
Fig. 1 shows a perspective view of a slicing machine embodying my invention.
Figure 23:
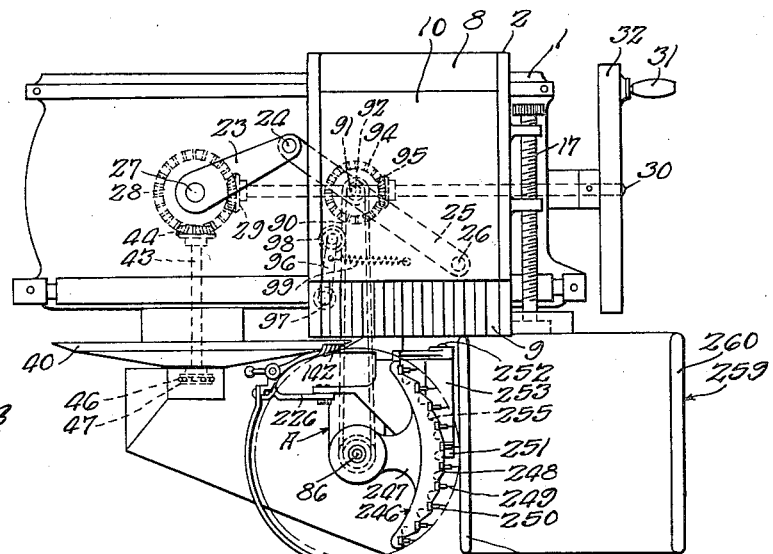
Fig. 23 is a modification of a stacking mechanism in which vertical fingers are used for discharging the slice.

The means for slicing the substance may be of any desired type but is preferably one in which the knife is rotatable in a stationary bracket and in which the substance table moves recurrently past the cutting edge of the knife with the substance supported on the table in position to be cut by the knife. The table is also provided with suitable feeding mechanism for feeding the substance toward the cutting plane of the knife and while I have illustrated one form of reciprocating table and feed table mounted thereon together with suitable pawl and ratchet means for actuating the feed table, I wish to have it understood that my invention is not limited to the details of the means for supporting the substance while it is sliced. It is sufficient to state that the substance is moved intermittently toward the cutting plane of the knife so that the knife will cut successive slices therefrom. The feed may be manual, but preferably it is mechanically controlled so that uniform slices will result.

In the drawings, the base of the slicing machine is illustrated by the reference numeral 1. A main supporting table 2 provided with downwardly extending brackets 3 and rollers 4 travelling in the grooves 5 in tracks 6, reciprocates in the base 1 longitudinally thereof, while guided by the grooves against lateral movement and held against vertical movement by the tongue 7 (Fig. 6) which engages within a suitable groove in a vertical face on the tracks 6. Any other suitable form of guiding means for the table may be used, if desired.

The upper surface of the table carries a plate 8 having the grooves 9 therein adjacent the cutting plane of the knife. A feed plate 10 slidably mounted on the plate 8 is guided by one side by a releasable guide 11 and on the other side by the guide rod 12 in the manner illustrated in the co-pending application, Serial No. 471,135 of Joseph Folk, filed July 28, 1930.

The feed plate 10 has a block 13 secured to one side thereof, and this block is releasably connected to the bracket 14 which has a bearing surface thereon engaging the rod 12. An operating knob 15 releasably secures the block 13 to the bracket 14 in a manner described in the aforementioned application. The releasable guide 11 is released by means of operating handle 16. A feed screw 17 journaled in suitable bearings on the underside of the table 2 and just beneath the guide rod 12 co-operates with a nut carried by the bracket 14 and when the feed screw is rotated the bracket is moved to and from the cutting plane of the knife and the feed plate is also carried along thereby in view of the rigid connection to the bracket 14.

The feed screw may be actuated in any suitable manner after each complete reciprocation of the table, and while the table is away from the cutting edge of the knife. In other words, the substance is fed toward the cutting plane of the knife at the position nearest the operator and furthest away from the knife, so that the substance will not be fed while opposite the knife. Mounted on the side of the feed table, which is opposite the operator, are a pair of guides 18 and 19 which guide the clamping bar 20 and the operating handle 21 therefor in a vertical direction. The clamp is provided with a clip ring 22 which releasably holds the clamp against upward movement except when released by the operator, but which permits downward movement by merely applying pressure to the handle 21 in a downward direction. The table is reciprocated by means of a rotating crank 23 pivotally connected at 24 to the pitman 25. The pitman in turn being connected at 26 to the underside of the table 2. The crank is rotated on a shaft 27 (see Figs. 2 and 4) which is rotatably supported in the base and carries a bevel gear 28 on the underside thereof, which in turn, meshes with a bevel gear 29 on the shaft 30 rotated by the handle 31 on the flywheel 32 secured to the shaft 30. As the flywheel 32 is rotated, the crank is also rotated and the rotation of the crank causes a reciprocation of the table by means of the pitman connection 25.

The knife bracket or chain box 33 best illustrated in Figs. 3, 4 and 5, has two hollow sections 34 provided adjacent the vertical face 35 of the base 1 and the walls of the hollow sections 34 which lie adjacent the face 35 are slotted as at 36 and grooved as at 37. The grooves 37 receive the pins 38 to guide the chain box for vertical movement. The bolts 39 extend through the slots 36 and are used to clamp the chain box in any vertical position to which the same may be adjusted. With this arrangement the chain which drives the knife may be tightened as will appear hereinafter.

The slicing machine knife 40 is rotatably supported on a spindle 41 mounted to rotate in suitable antifriction bearings held within the split bearing 42. In Fig. 4 it will be noted that there is a shaft 43 having a bevel gear 44 thereon meshing with the bevel gear 28. The shaft 43 extends through the side of the base and carries a sprocket 45 on the end thereof which is outside of the base. There is also a sprocket 46 secured to the spindle 41 and a chain 47 is trained over the sprockets 45 and 46 so that as the shaft 30 is rotated, the knife is rotated also through the intermediary of the gear 44, shaft 43, sprocket 45, chain 47 and sprocket 46. A cover 48 best illustrated in Figs. 1, 5 and 6, is secured to the side of the base and overlies the rollers 4 (see Fig. 6) by means of the screws 49 (see Fig. 5). This prevents any foreign material such as grease, scraps and the like, from falling on the tracks 6 and on the rollers 4. It is obvious that the tracks and rollers must be kept free from foreign material if the table is to be reciprocated with any amount of accuracy.

The knife bracket 33 has an auxiliary bracket 50 secured thereto as best illustrated in Figs. 12 and 13 by means of the screws 51. The auxiliary brackets 50 are arranged within a recess 52 in the face of the bracket 33 which is next to the knife to prevent rotation of the auxiliary bracket 50 in a plane parallel to the knife. The screws 51 prevent movement of the auxiliary bracket 50 in a direction to and from the knife.

The auxiliary bracket 50 has arms 53 and 54 extending upwardly and outwardly therefrom, as clearly illustrated in Figs. 3 and 13. The arm 53 has an open end slot 55 in the end thereof and this slot extends in a horizontal direction. The arm 54, as best illustrated in Fig. 7, is provided with a spring clip 56 thereon and spaced from the end of the arm 54 for a portion of its length to provide a recess for a purpose which will hereinafter appear. The spring clip 56 is also provided with a flared end 57, the purpose of which will also appear shortly. The guard 48 carries a pin 58 on the end of which is a knurled nut 59. The knife guard 60, which is substantially circular in cross section, but open at the inner side to receive the knife, as clearly illustrated in Fig. 7, is adapted to be supported by means of the arm 53 and the guard 48. The knife guard 60 carries a screw 61 and this has a knurled nut 62 screw-threaded thereon. The slot 55 is adapted to receive the shank of the screw 61 and a slot 63 on the lug 64 secured to one side of the knife guard 60 is adapted to receive the shank of the screw 58. The slots 55 and 64 are parallel so that the knife guard may be adjusted in a direction parallel to the cutting plane of the knife as the knife's diameter is changed due to successive sharpenings. Of course, tightening the nuts 59 and 62 will hold the knife guard 60 in its adjusted position.

The knife guard is provided with an auxiliary section 65 pivoted at 66 to the main portion of the knife guard 60 and a thumb screw 67 is used to lock the section 65 in adjusted position about its pivot or to exert enough frictional force to prevent the guard from being moved accidentally out of a position to which it has been moved by the operator. The knife guard 60 and the section 65 have the co-operating hinge butts 68 and 69 secured respectively thereto and the pivots 66 extend through both of the hinge butts. The hinge butt 68 has a stop 70 thereon adapted to engage the butt 69 to limit the counter-clockwise movement of the section 65 as viewed in Fig. 3.

The free end of the section 65 carries a downwardly extending tongue 71 which tongue is so arranged that it will stroke the flared portion 57 on the clip 56 and be guided into the space between the clip 56 and the arm 54 and frictionally held therein to prevent the section 65 from being moved upwardly out of operative position over the knife, except when the operator so desires. An operating knob 72 is secured to the upper side of the section 65 and is adapted to be grasped by the operator when moving the section 65 about its pivot. The other plate 73 pivoted at 74 to the end of the section 65 has a notch 75 therein, of substantially the same shape as the edge of the knife which it embraces. The knife is hollow on the side thereof next to the slicing machine table and the notch 75 is so cut in the plate 73 that one side 76 thereof is substantially parallel to the adjacent face of the knife and in close proximity thereto. As the guard is brought into its operative position, the plate and the forward edge of the guard are slightly flatter to the right than illustrated in Fig. 7, so that when the clip 71 strikes the flared portion 57 it is carried to the left and downwardly thereby moving the edge 76 of the slot 75 closer to the hollowed face of the knife so that very little grease or foreign material can be collected on the face of the knife to mar the appearance thereof and impair its usefulness. Any scraps of meat are scraped from the edge of the knife by the plate 73 and the same dropped downwardly into a scrap pan mounted below the knife and which will be described presently.

In most instances, or at least in a great number of instances, the slicing machine is either placed with the slicing machine knife substantially against a side wall of the butcher shop or delicatessen store so that there is very little space between the knife end of the slicing machine and the wall, or the slicing machine is placed on a counter which usually has an upstanding glass enclosure at the front thereof, and sometimes an additional top shelf such as 77 which overhangs a portion of the knife, or at least projects into such a position that the knife guard cannot be moved out of the way. The knife guard 65 which I have shown in the drawings can be pivoted to an inoperative position and clamped therein by the screw 67 even though the knife end of the slicing machine is against the wall or on a counter where a shelf such as 77 might be in the way. Even where the slicing machine is used on the ordinary counter, the guard 65 protects the customer and prevents him from moving his hand into contact with the exposed surface of the knife, at least to some extent. However, one of the novel features of the pivoted guard 65 is that it does not increase the overall length of the machine and therefore enables one to place the machine with the guard 60 even abutting against the wall, if necessary. The sharpener indicated generally by the reference numeral 78 has the grinder 79 and burr removing element 80 which can be moved into and out of operative position by rotating the same on the spindle 81 and raising the same to clear the knife. The details of this grinder will not be further described herein as the same are immaterial to the present invention.

I will now proceed to describe the mechanism for deflecting the slices away from the knife and carrying them to a slice receiving position and for depositing the slices in that position. This means is best illustrated in Figs. 1, 2, 3, 4, 9 and 11. A main bracket designated by the reference numeral A and illustrated in perspective in Fig. 11 is adapted to carry the stacking mechanism. This bracket comprises an upper surface 82 and depending flanges 83 forming a housing for certain of the operative portions of the stacking mechanism. Bosses 84 and 85 formed integrally with the bracket A and extending above and below the upper surface 82 thereof form a bearing for a spindle 86 rotatably mounted in bushings 87 carried by bosses 84 and 85. A sprocket 88 carried by the lower end of the shaft and secured thereto by the pin 89 has a chain 90 trained thereover, as illustrated in Fig. 4, and this chain is also trained over a sprocket 91 secured to the shaft 92 rotatably mounted in the bracket 93. The shaft 92 also carries a bevel gear 94 meshing with a bevel gear 95 on the main operating shaft 30. The gears 94 and 95 have a ratio of 2–1, and the sprockets 91 and 88 are of the same diameter. It will be noted that the gears 28 and 29 also bear a 2–1 ratio to each other so that the shaft 86 will rotate once for each complete reciprocation of the table 2. The specific gearing used for getting the 1–1 ratio between the rotation of the shaft 86 and the rotation of the shaft 27 is immaterial as it is obvious that this reduction can be obtained in other ways. An arm 96 pivoted at 97 to the underside of the base 1 carries a roller 98 at the free end thereof and this roller engages one run of the chain 90. A spring 99 secured to the base and the pivoted arm urges the roller 98 against the chain to tension the chain for a purpose which will appear more clearly hereinafter. As best illustrated in Figs. 5, 6 and 14, the bracket A has an offset portion 100 in which there is a groove 101 which receives the tongue 102 formed on the adjacent side of the base 1 on a boss 103. Bolts 104 pass through elongated slots 105 in the bracket A as best illustrated in Fig. 5, and are threaded in threaded openings formed in the base 1 just below the tongue 102. This enables one to adjust the bracket A longitudinally of the base for a purpose which will appear later when the stacking mechanism is described. Due to the adjustment of the base, the distance between the centers of the shafts 86 and 92 varies and therefore it is preferable to use the chain drive such as illustrated in Fig. 4 and the tension roller 98 compensates for differences in the positions of the bracket A and automatically keeps the proper driving connection between the shafts 92 and 86.

As best illustrated in Figs. 5 and 6, the offset portion 100 of the bracket A has a member 106 secured thereto by the screws 107 and this member has an upwardly inclined portion 108 which has the free end thereof substantially at the same height as the surface 109 of the chain box 33 which is formed on that portion of the chain box which connects the chain box to the base and which leaves a space between the main or body portion of the chain box and the adjacent side of the cover 48.

A scrap pan 110 having a long handle 111 bent into a hook shape 112 is adapted to be positioned beneath the knife to catch scraps which fall from the knife and which may be scraped from the knife by the plate 73. This scrap pan also catches any grease that may fall from the knife.

As will be clear from an inspection of Fig. 5 there is a slice receiving platform 113, the details of which will be described later, and it is for this reason that the upper surface of the offset portion 100 is made low enough to accommodate the scrap pan 110 beneath the slice receiving plate 113 as the same is being withdrawn from its operative position beneath the knife. The upwardly inclined portion 108 on the member 106 guides the pan 110 to its higher elevation on the surface 109 when the scrap pan is being placed in its operative position. When the scrap pan has been moved to its operative position beneath the knife, the hooked portion 112 thereof has its extreme end arranged within the opening 114 formed in the bracket A so as to hold the scrap pan in position and prevent the turning of the scrap pan. A notch 115 is formed in one end of the scrap pan, as best seen in Fig. 15, so that as the scrap pan is being moved into operative position, the edge of the knife will not be engaged thereby.

The upper surface 82 of the bracket A as best illustrated in Fig. 11 but also illustrated somewhat in Figs. 3, 6 and 8, carries an upstanding auxiliary bracket 116 secured thereto by bolts 117, which pass freely through the upper surface of the bracket A and are screw threaded in the auxiliary bracket 116, see Fig. 8. The upstanding flange 118 formed as an integral part of the auxiliary bracket 116 carries a finger guard support 119 secured thereto by the screws 120. A finger guard 121 secured to the support 119 by the screws 122 has an upwardly extending continuous portion 123 and horizontally extending fingers 124 shaped in the manner best illustrated in Figs. 1 and 2. The spaces between the fingers 124 are for a purpose which will appear hereinafter. The continuous portion 123 lies outside of the path of movement of the fingers 174 described later so that if the operator moves his hand too close to the path of movement of the prongs adjacent the portion 123, the portion 123 will prevent his hand from contacting with the prongs, whereby injury to the operator is prevented.

The auxiliary bracket 119 also carries a deflector support 125 secured thereto by the bolts 126. This support 125 and the parts supported thereby are illustrated clearly in Figs. 2, 3, and 8; formed integrally with the support 125 is an upstanding member 127 having the lugs 128 and 129 spaced to one side thereof. The lower bearing 129 carries a pin 130 secured therein by any suitable fastening means such as the screw 131. The upper bearing 128 carries a slidable pin 132 spring-pressed downwardly by a spring 133 arranged within the recess 134 in the bearing 128. To the upper end of the pin 132 there is secured a cam member 135 having an operating handle 136. The cam 135 and bearing 128 have co-operating sloping surfaces as clearly illustrated in Fig. 3 so that when the handle 136 is rotated, the pin 132 will be retarded within the recess 134 and moved away from the pin 130.

The pins 130 and 132 engage within conical recesses in the deflector 137. The deflector 137 has an offset lug 138 spring-pressed by means of the spring 139 in a counter-clockwise direction as viewed in Fig. 2. An adjustable set screw 140 limits the rotative movement of the deflector under the influence of the spring 138 by engaging a lug 141 formed as an extension of the bearing 129. The operative portion of the deflector is best illustrated in Figs. 1, 2, 3, and 9. This portion comprises a plate having a plurality of fingers 142 formed from a single piece of sheet metal and held together by the portion 143, best illustrated in Figs. 2 and 9. In Fig. 9 I have illustrated the construction of the fingers in a slightly exaggerated manner to bring out more clearly the way in which the slices are acted upon by the deflector, as well as the finger guard 121. Each of the fingers is formed with a double curvature on the slice engaging side thereof. There is one curvature 144 which performs the function of the usual deflector, viz: to deflect the slices away from the edge of the knife and there is a second curvature which is formed by a radius R substantially equal to the distance between the deflector and the center of the shaft 86, at least the radius R is one which will form the surface 145 so that it is somewhat concentric with the center of the shaft 86 and the drum supported thereby, the drum being described presently. The length of the fingers 142 is not very great for it has been found that after a considerable amount of experimentation, a long deflector has too much resistance to the movement of the slice thereover, and there is a buckling of the slice which prevents it from being carried away properly on the surface of the drum to be described presently.

The shaft 86 carries a cam 146 which is secured thereto and has a cam surface 147 adapted to engage a roller 148 pivoted at 149 to an arm 150. This will be described more in detail later on. The shaft also carries a drum member 151 which is rotatably mounted on the shaft 86 and is adapted to cover the cam 146 and other parts of the operating mechanism to prevent dust and dirt from accumulating thereon. The upper part of the cam 146 has a boss 152 integrally formed thereon. A spring 153 (Fig. 16) mounted within the telescoping sections 154 and 155 secured respectively by the pivots 156 and 157 to the boss 152 and the underside of the member 151, is adapted to yieldingly urge the member 151 in a counter clockwise direction as viewed in Figs. 2 and 16. A stop 158 having a yielding surface 159 thereon is adapted to arrest the rotating movement of the member 151 when it engages the stop pin 160, screw threaded through the drum 151 into the path of movement of the stop member 158 which is mounted on the boss 152. This arrangement permits the member 151 to be rotated in a counter-clockwise direction if and when desired. In other words, ordinarily the spring 153 will cause the member 151 to rotate with the shaft 86 and at the same speed as the shaft 86, but when a force is exerted to retard the rotation of the member 151, the member 151 can rotate at a lesser speed than the speed of rotation of the shaft 86.

The upper portion of the shaft 86 is adapted to carry the means for conveying the slices away from the knife after the same has been severed from the substance. This means comprises a segment 161 of a cylinder, or substantially of a cylinder, having the bearing portions 162 and 163 embracing the shaft 86. The bearing portion 163 has a collar 164 and a bearing 165 secured thereto and this embraces the sleeve bearing 165 secured to the shaft 86 by means of the pin 166. A suitable anti-friction bearing 167 is interposed between the lower side of the collar 164 and a seat on the bearing 165. A locating pin 168 is secured to the upper side of the member 151 and enters a suitable opening in the bearing portion 163 and collar 164 to cause the drum 161 to rotate in unison with the member 151. In order to facilitate the quick removal of the drum 161 from the shaft 86 I provide a latch 169 pivoted at 170 and spring-pressed in a counter-clockwise direction, as viewed in Fig. 3 by means of a spring 171 to bring the lower point 172 of the lever over the bearing 162 to prevent the upward movement thereof and of the drum 161. However, by merely manually rotating the latch 169 against the action of the spring 171, the latch is retracted within the recess 173, thereby enabling one to lift the drum and disengage the bearings 162 and 163 from their operative relation to the shaft 86.

To the outer surface of the drum 161 there are secured a plurality of vertical rows of prongs 174 all of which extend radially from the shaft 86 with the exception of the two rows 174A and 174B which do not extend radially, but rather extend substantially in a direction parallel to the adjacent row of prongs 174C for a purpose which will hereinafter be described.

These vertical rows of prongs are adapted to pass between the fingers 124 on the knife guard 121 and the spaces between the fingers 142 on the deflector. As the slices B are deflected away from the knife by the deflector, there is a tendency for the slices to curl as indicated by dotted lines 175 in Fig. 9. Excessive curling of the end of the slices B is prevented by engagement thereof with the fingers 124 on the finger guard. After a considerable portion of the slice has been severed from the substance, the free end of the slice has a tendency to be thrown back against the deflector and engage the curved portion indicated by 145, this portion 145 being shaped concentrically or substantially so with the center of curvature of the drum 161 which tends to form the slice substantially to the same curvature as the drum and while the prongs are holding the slice. In other words, the deflector tends to force the slice onto the prongs as the same are severed by the knife and insure that the slice takes a shape which is substantially the same as the curvature of the drum, as otherwise the slices would not be properly held on the drum and difficulty might be experienced in removing the slice by the fly which will be described presently. The slice B shown in full lines in Fig. 9 illustrates the shape given to the slice by the deflector as the slice passes over the surface of the deflector and is impaled in proper relation on the drum. The fingers 124 also serve the purpose of preventing the slices from being thrown too close to the surface of the drum 161. It is not desired to have the slices close to the surface of the drum 161 for the reason that the fly which is to discharge the slices from the drum is normally arranged close to the surface of the drum and must get beneath the slice in order to deflect it. It has been found that in actual practice, when cutting thin slices, that if the finger guard is not provided, the slices have a tendency to curl inwardly too much, as indicated at 175, and position themselves too close to the surface of the drum and when they arrive at the discharge position, the slice is between the fly and the adjacent surface of the drum rather than on the opposite side of the fly. The result is that the slice is not discharged and will remain on the prongs until manually removed by the operator.

After the slices have been picked up by the prongs on the drum 161, the drum is moved through 270° until it is in the position shown in Fig. 2. The slice is adapted to be removed from the prongs 174 when the drum reaches this position and deposited on the slice receiving plate 113, the fly designated generally by the reference numeral 176. This fly comprises a plurality of fingers 177 carried out as at 178 and attached to the upwardly extending portion 179 which is preferably cast integrally with the fingers 177. The portion 179 lies outside the path of movement of the prongs 174 and being between the drum and the operator's position acts as a means for preventing injury to the operator similarly to the manner in which the continuous portion 123 acts as a means to protect the operator. The upwardly extending member 179 has a forked extension at the bottom thereof forming portions 180 through which the pivot 181 extends, this pivot being secured in place as indicated in Fig. 8 by the set screw 182 which extends through the bearing support 181' for the pivot 182 and engages within a recess in the pivot 181. The bearing member 181' is secured in place by machine screws 182' which pass through the upper surface 82 of the bracket A. The fly 176 is adapted to be moved from the position indicated by full lines in Figs. 1, 2 and 3 to the dotted line position shown in Fig. 3 when the drum 161 reaches the position indicated in these figures. It is moved quickly to a discharge position by a spring acting on the extension 183 on the bearing portion 180, as best illustrated in Figs. 3, 17 and 18. The form of spring which I prefer to use is one comprising a pair of telescoping members 184 and 185 which encase the spring 186 and form a dust-proof casing therefor, as well as means for preventing distortion of the spring laterally thereof. The member 184 is pivoted at 187 to the extension 183 and the section 185 has a threaded member 188 screw threaded in the end thereof and held in adjusted position by the lock nut 189. A threaded member 188 has a conical portion 190 seating against the periphery of an opening 191 formed in the downwardly extending flange 83 on the main bracket A. Normally the tension of the spring holds the conical portion 190 against its seat, but in case the spring should break, it is desired to prevent the telescoping sections from falling downwardly, as they might if the spring were broken. In order to prevent this, I insert a cotter key 192 through an extension 193 on the threaded member 188 and this prevents the member 185 from being moved to the left in case the spring is broken. As soon as the member 185 cannot be moved to the left, it is impossible for the conical portion 190 to become permanently disengaged from its seat.

Any other form of spring or supporting means may be used in carrying out my invention but that shown in the drawings is one which can be attached quickly and is yet rugged enough to withstand the exacting performance required of this machine. The tension of the spring can be regulated by the threaded member 188 and the lock nut 189.

The spring 186 moves the fly in a clockwise direction about its pivot as viewed in Figs. 3 and 18 and the counter-clockwise movement of the fly is accomplished by means of the cam 146 which co-operates with roller 148. It is obvious from an inspection of Fig. 3 that the cam surface 147 is so shaped as to gradually move the cam back to its vertical position after the discharge movement which is accomplished by the spring 186. The cam has one surface 194 thereof parallel or substantially parallel with the axis of the shaft 86. When the cam is rotated into the position shown in Fig. 3, the roller 148 has been moved downwardly the maximum amount and the cam is holding the fly in the vertical position. However, a small additional movement to the shaft 86 brings the roller 148 adjacent the surface 194 of the cam, which surface being abrupt and substantially parallel with the shaft 86, causes the fly to move quickly in a clockwise direction into discharge position. The fingers of the fly, when in their vertical position, are spaced inwardly from the points of the prongs 174 a sufficient amount to bring the fingers beneath the slice carried by the prongs. Accordingly, when the slices reach the discharge position the fly is quickly moved to strip the slices from the prongs and deposit them upon sheets of paper 195 carried on the slice receiving plate 113. As the drum continues its movement, the roller 148 travels over the cam surface 147 and moves the cam again into a position so that it is between the rows of prongs and spaced inwardly from the points thereof so that the next slice carried around into discharge position by the drum 161 may be discharged by the fly.

In hands of a skilled operator, ordinarily the flywheel 32 will be rotated in a clockwise direction or in a right-hand direction as referring to the operator's position, and the cam 146 will be caused to rotate in a counter-clockwise direction as viewed in Fig. 2, or from the left to the right as viewed in Fig. 3. However, an unskilled operator may reverse the motion of the handle 32 and due to the abrupt surface 194 on the cam, the side of the roller instead of the top thereof, will be engaged and may cause a jam which will result in distortion of the arm carrying the roller 148 if the arm were rigidly mounted on the extension 183. I therefore mount the arm 150 in such a manner that when the cam 146 rotates in other than the intended direction, the arm 150 may pivot about the pivot 149 and therefore prevent the occurrence of any damage. This is best illustrated in Figs. 3 and 10. The arm 150 has a pin 196 rigidly secured thereto and extending downwardly along the vertical face of the extension 183. A spring 197 having an opening therein through which the pin 198 extends and a screw 199 which holds the spring in operative position along the side of the extension 183, is adapted to engage the pin 196 and press the same against the vertical face of the extension 183. Normally therefore, when the cam 146 is rotating in its proper direction, the pin 196 is urged against the vertical face of the extension 183 and the arm 150 thereof acts the same as if it were rigid with the extension. However, if the cam is rotated in the opposite direction, the vertical surface 194 thereof will engage the roller 148 and move the arm 150 about its pivot against the action of the spring 197 and out of the path of the cam surface of the cam thereby preventing any damage.

It is sometimes desirable to reverse the rotation of the cam either for withdrawing the substance from the knife after it has been moved partially into engagement therewith or for other purposes. It is therefore desirable to provide this means of preventing accident rather than to provide an irreversible driving arrangement for the shaft 30. Another advantage of having the arm 150 yieldingly held in position is that when the roller is ready to drop off the high portion of the cam to move the fly to discharge position, the roller, just as it begins to ride off the high portion of the cam is deflected sidewise against the action of the spring to permit the fly to discharge more quickly than it otherwise would. The accentuated movement of the fly has a tendency to remove the slice substantially instantaneously during the continuous movement of the drum 161, whereas otherwise the initial movement of the fly would be relatively slow and the result would be that holes would be torn in the slice, particularly if it were relatively thin. The reason for this is that since the fly is held against rotative movement in the direction in which the prongs are moving, there would be a brake exerted on the slice and this would tend to retard the slice as the drum rotates and prevent the proper removal of the slice without the tearing thereof.

The slice D, when ready to be discharged, is in the position illustrated in Figs. 1, 2 and 3, and the forward portion 198 thereof has been stripped from the prongs and rests against the bases of the fingers 177 as is clearly illustrated in Fig. 2. The tail end 199 of the slice, however, is still held by the prongs as is also the middle portion thereof. If all of the prongs were extending radially, holes would be torn in the slices when the fly moves to discharge position and in order to prevent this I have made two of the rows of prongs 174A and 174B extend in the directions indicated in Fig. 2 and described previously. This prevents any substantial tearing of the slices. If desired, I may make all of the rows of prongs parallel, as in the modification to be described presently.

The prongs move so as to engage the slice as it is being severed, but the peripheral speed of the prongs is different than the linear speed of the table 2. Therefore the prongs are quite apt to tear holes in the slices. For this reason I have provided the spring 153. The prongs are rotated at a slightly greater speed than the substance table, as the prongs are removing the slice after the same has been formed. Therefore there is a tendency of the slice, while still attached to the substance, to rotate the drum in the opposite direction. This is permitted by the spring 153. However, as soon as the slice has been severed completely from a substance, the spring expands and moves the pin 160 against the stop 158 so that the drum will be in correct position to engage the next succeeding slice when it begins its next cycle of operations.

The discharge movement of the fly is checked by means of a brake 200 best illustrated in Figs. 3, 4, 19 and 20. In Fig. 19 the cover is shown removed. The brake comprises a block 201 covered by a friction member 202 of leather or the like. A pivot 203 extends horizontally through the block and is mounted in bearings in the lowermost ends of the arms 204 pivoted at 205 to the extension 183. A vertical guide bracket 206 is secured to the underside of the upper surface 82 of the bracket A by the screws 207, as best illustrated in Figs. 3 and 9. The brake surface is formed by a piece of stainless steel 208 secured by means of the screws 209 to the rib 210 on the bracket 206. A cover 211 mounted on the pivot 203 straddles the rib 210 and the braking surface 208 thereon. This cover has a tendency to prevent any substantial amount of grease from working into engagement with the braking surface which must be maintained clean and free from moisture or lubricant. A single drop of lubricant on the braking surface 208 will prevent any substantial amount of braking effect by the brake 200. For this reason it is desirable to prevent any lubricant from falling or being conveyed onto the braking surface. The shield 211 prevents the operator from oiling the pivot 203 too close to the brake 200 and the drip extensions 212 prevents any lubricant travelling down the arms 204 to the pivot 203 as any lubricant which might be applied to the pivot points 181, 205, 187 or 149 will travel down the arms 204 and on the underside thereof. The projections 212 will then cause the lubricant to form in drops at the ends of the projections 212 and drop to the base of the machine or to the counter rather than to be conveyed to the pivot point 203.

As the fly is moved into its discharge position, the brake travels upwardly along the braking surface 208 and near the upper extent of its travel exerts sufficient braking effect to stop the movement of the fly under the action of the spring 186 and substantially before the brake reaches its uppermost position. However, in the event that the braking surface 208 has a small amount of lubricant thereon to destroy the usefulness of the brake to some extent, it is desired to prevent any damage or any excess amount of noise which might be caused by the brake striking the underside of the surface 82. For this purpose I provide a buffer 213 secured by a screw 214 to the underside of the surface 82, the buffer being partially arranged within a recess in the underside of the surface 82. However, the brake ordinarily comes to rest before it reaches the buffer 213.

The slice receiving plate 113 is supported by the arm 215 and resting on the machine bosses 216 (see Figs. 3, 4 and 11). A clip 217 secured by a screw 218 to the end of the arm 215 has an upwardly extending extension 219 projecting above the surface of the plate 113, and a similar clip 220 secured by a screw 221 directly to the plate 113, also has an extension 219 thereon. The extensions 219 prevent lateral movement of the paper on the slice receiver so when the slices are thrown onto the paper, the paper will not creep toward the edge of the slice receiver and the slices will be properly stacked one upon the other. Cellophane sheets of paper are now being used for wrapping meat and the like, and if a plurality of sheets are stacked one upon the other, it is very easy for these to creep toward the edge of the slice receiver, especially in the direction toward the clip 217 for the slice is moving in that direction when it lands on the paper or the preceding slices. The clips, therefore, serve the double purpose of holding the slice receiving plate in position and preventing lateral movement of the paper. A cover plate 222 (Figs. 21 and 22) has openings 223, 224 and 225 therein and is supported by the extension 226 on the member 125, arm 227 and boss 228, the latter being formed on the auxiliary bracket 116 shown in Figs. 8 and 11. A screw 229 extends through the opening 224 into a threaded opening in the boss 228 to hold the plate firmly on the boss. Vertically extending rods 230 and 231 have screw threaded extensions 232 and 233 extending through the openings 223 and 225 respectively in the plate 222 and also through openings in the extension 226 and arm 227. The extensions 232 and 233 are threaded and nuts 234 and 235 clamp the vertically extending members 230 in place and firmly hold the cover plate 222 in the position illustrated in the drawings. As clearly illustrated in Figs. 3, 8, and 21 the cover plate 222 has a downwardly extending portion 236 which engages the upper surface of the slice receiving plate 113 to prevent scraps of meat and grease from getting down between the edge of the plate and the adjacent portion of the bearing 181'. This extension 236 also tends to hold the plate down on the supporting bosses 216. As illustrated in Figs. 3 and 8 there is an opening 237 in the plate 222 to receive the shaft 86 and cam 146 with its extension 152. The member 151 is made sufficiently large to cover the opening 237 and a considerable portion of the plate beyond the edge of the opening 237 to prevent foreign matter from falling down into the cam and associated mechanism.

The plate also has openings 238 for the reception of the bearing portions 180 of the fly and these openings are sufficiently large to permit movement of the fly about its pivot. An opening 239 is also provided (see particularly Fig. 6) to permit an oil cup 240 to be provided on the bearing 181' and in a position to be easily oiled by the operator.

The upwardly extending members 230 and 231 have the body members 262 secured thereto by the screws 263. The members 230 and 231 are also grooved at 264 (see Fig. 2) to receive the vertical edges of the transparent celluloid member 265 which can be removed merely by sliding the member 265 vertically in the grooves 264.

In the modification shown in Figs. 23 to 29 inclusive, similar reference characters refer to corresponding parts in Figs. 1 to 22 inclusive.

Figures 26, 28:
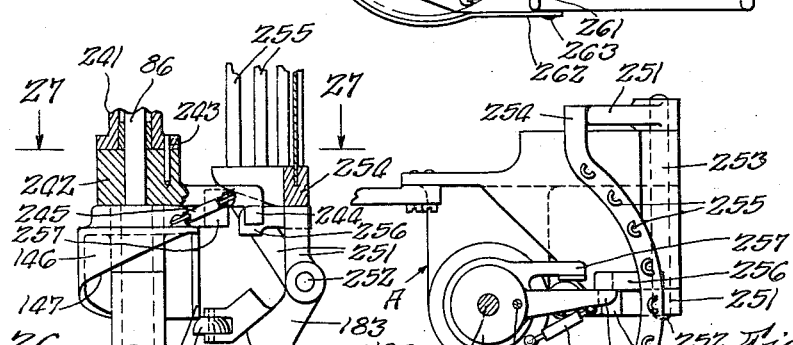
Fig. 26 is a fragmentary elevational view partly in section showing the cam mechanism for operating the discharge fly.
Figs. 28 and 29 are similar to Fig. 27 but show the parts in a slightly different position of adjustment.
Figures 27, 29:
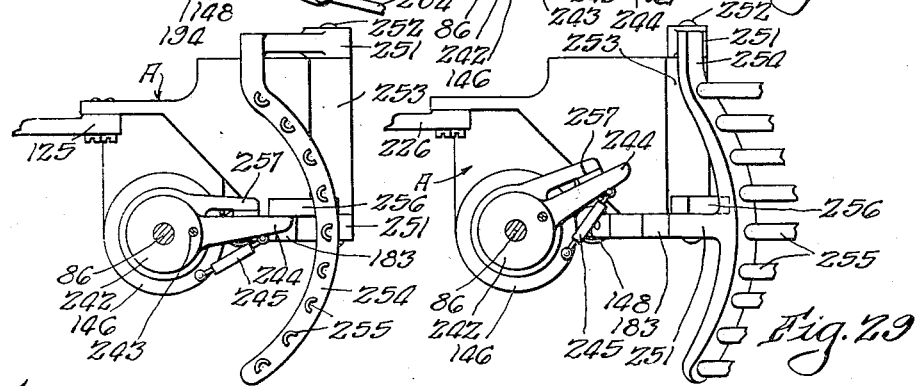
Fig. 27 is a plan view of the mechanism shown in Fig. 26.

The vertically extending shaft 86 carries the sleeve 241 which is constrained to move with the member 242 rotatably mounted on the shaft 86 by means of a pin 243. The member 242 corresponds to the member 151 in the first embodiment described. The member 242 carries an extension 244 which extends outwardly and downwardly as illustrated in Figs. 24 and 26. A compression spring 245 is arranged within the telescoping casing 245 the same as in the first embodiment, so as to permit the member 242 to move relative to the cam 146 and to the shaft 86. The roller 148 in this embodiment is not shown as being mounted yieldingly on the extension 183, but it may be so mounted if desired.

The sleeve 241 has an arcuate portion 246 connected by a web 247 to the sleeve 241. The arcuate portion 246 has downwardly extending prong carrying members 248 which have the prongs 249 thereon, these prongs being provided with a shoulder 250 to limit the movement of the slices inwardly toward the members 248. It will be noted from an inspection of Fig. 25 that prongs are all arranged parallel to each other so that when the slice is removed from the prongs, the holes will not be torn in the slices, for the slices are removed in the direction in which the prongs extend. Furthermore, as will appear hereinafter, the prongs are stationary when the slice is removed, instead of moving as in the first embodiment.

The fly in the present instance comprises bearing portions 251 pivoted at 252 to a bearing 253. An arcuate portion 254 formed integrally with the bearing portions 251 carries upwardly extending semi-tubular members 255, all of which are parallel and spaced so as to enable them to pass between the members 248 when discharging the slices from the prongs 249. In the present instance, the prongs are arranged on vertically extending members and the fly has vertically extending fingers. It is therefore necessary to properly align the spaces between the members 248 with the tubular members 255 before the discharge fly may be moved to discharge position. I therefore provide a stop 256 on the fly and when the members 255 are extending vertically and are arranged between the shaft 86 and the downwardly extending members 248, stop 256 is in position to engage the projection 244 and arrest movement of the member 242 and sleeve 241. The projection 244 and stop 256 are so positioned that when they are in engagement with each other, the tubular members 255 are aligned with the openings between the members 248 and the fly may be moved to discharge position.

After the fly has been moved to discharge position, the spring within the casing 245 moves the member 242 until the extension 244 engages the stop 257 carried by the cam 146 on the upper surface thereof and corresponding to the stop 158 in the first embodiment.

The bracket 258 has a removable tray 259 thereon adapted to receive the slices as they are formed and as the ends thereof 260 and 261 turn upwardly to prevent the slices from being thrown off the tray. The end 261 acts also as a guard to prevent grease from contacting with the slices on the tray 259 and also acts as a means whereby the bearings for the pivot 252 are not contaminated by the grease and the like, thrown off by the meat.

The operation of this device shown in Figs. 23 to 29 inclusive, is as follows: When the crank 32 is rotated and the shaft 86 also is caused to rotate through the gearing previously described, the slice is picked up on the prongs 249 and carried through substantially 270° into slice discharging position. In this position the extension 244 and stop 256 engage each other and temporarily the motion of the sleeve 241 and members 248 is arrested to permit the fly to move to discharge position and discharge the slices F onto the tray 259. As is clear from an inspection of Fig. 24, as soon as the members 255 are clear of the members 248 the stop 256 releases the extension 244 and the extension 244 is moved into engagement with the stop 257 so that the prongs will be in proper position to pick up the next slice as it passes the edge of the knife.

Applicant's invention enables the slices to be cut without being touched by human hands. The operator when placing the substance on the table can hold the same with paper so that his hands do not come into contact therewith and from the time the substance is placed on the table until it is wrapped, it is unnecessary to touch the substance whatsoever as the slices are evenly stacked and fall directly onto the paper. The slice receiving plate can be quickly removed for cleaning purposes, the scrap pan can readily and quickly be removed and the operating parts of the machine are protected from scraps of meat falling thereon, also the meat and the slices are so protected that none of the lubricant used in lubricating the various parts of the machine will come into contact with the meat and thus contaminate the same. The parts are quickly removable for the purpose of cleaning and in view of the fact that customers do not like to see machines covered with grease, it is believed that this is a very important feature. The slice deflector, the rotating drum, the transparent shield 265 and the slice receiving plate can easily be removed and cleaned and replaced in a very short amount of time. When these parts are removed, the other parts of the machine are readily accessible and may be cleaned without much trouble. The knife guard 60 is also quickly removable for cleaning purposes and the knife sharpener can be put into operative position quickly merely by moving the extension 65 of the knife guard to an inoperative position.

Other embodiments of this invention will occur to those skilled in the art to which this invention pertains without departing from the spirit of this invention or the scope of the appended claims. Therefore I do not wish to limit myself except as set forth hereinafter in the claims.

Having thus fully described my invention what I claim as new and desire to obtain by Letters Patent is:

1. A slicing machine comprising a discharge fly, a spring for moving said fly in one direction, a brake for checking the movement of said fly in that direction, said braking mechanism including arms movable with said fly having a connection therewith to be lubricated and extending downwardly toward the point of connection with said brake, and means for directing lubricant, which may be supplied to said connection and travel downwardly along said arms toward said brake, in a direction away from the operative surface of the brake before the lubricant can reach the operative connection between said arms and brake.

2. In a slicing machine, the combination with a slicing knife, a table movable relative to said knife for presenting a substance to be sliced thereto, means for driving said knife and table relative to each other, a stacking mechanism bodily adjustable relative to said knife in a plane substantially parallel to the cutting plane of said knife, means connecting said stacking mechanism with the means for driving said knife and table relative to each other, whereby said stacking mechanism is driven in synchronism with the relative movement of said knife and table, said connecting means comprising an endless flexible band having sufficient slack for the purposes described whereby the driving connection can be maintained, and a tension means for normally tensioning the endless band to ensure smooth uniform actuation of said stacking mechanism through the intermediacy of said endless band.

3. In a slicing machine, the combination with a knife, of stacking mechanism for removing slices from the knife edge as the same are formed including a drum having substance engaging prongs thereon and a deflector having a double curvature in the direction of movement of the slices away from the cutting edge of said knife, one portion thereof which first engages said slices being curved toward the drum surface away from the cutting edge of the knife and in the general direction of movement of the drum and the other portion thereof which subsequently engages the slices being reversely curved and merging with said first curved portion, said second curved portion being of substantial length in the direction of slice movement thereover and having substantially all of its operative slice engaging surface arranged equidistant from the axis of rotation of said drum whereby the slices are directed onto said prongs and are then arranged on said prongs in substantial parallelism to the path of movement of the outer ends of said prongs before the slices leave said deflector.

4. In a slicing machine, the combination with a main support, of a knife support spaced therefrom but connected thereto by a web spanning the space between said supports, a table slidable on said main support, stacking mechanism mounted on the same side as said knife support and being spaced therefrom and having a connecting web connecting said stacking mechanism with said main support, a knife mounted on said knife support above said first mentioned web portion in spaced relation thereto, said stacking mechanism including a slice receiving plate spaced from said second web portion to provide a space therebetween which is in communication with said knife and adjacent web portion, a scrap pan adapted to be inserted in the space beneath said knife from the operator's side of said slicing machine comprising a reciprocable portion and a handle portion secured thereto, said handle portion comprising an elongated handle thereon of sufficient length to permit the operator to readily insert the scrap pan into the space beneath said slice receiving plate and then into the space beneath said knife, the web connecting said knife support and main support being elevated from the web connecting said mechanism and main support, and guiding means for guiding said scrap pan from the lower web to the upper web as pressure is exerted on the handle to move the scrap pan into position and without the necessity of the operator guiding the movement of the scrap pan.

5. A device as claimed in claim 4, in which the handle on said scrap pan has a curved extension on the end thereof extending toward the scrap pan, said slicing machine having a portion thereof provided with an opening adapted to receive said extension when the scrap pan is in its fully operative position whereby the scrap pan is maintained in proper operative position against displacement from that position.

6. In a slicing machine, the combination with a slicing knife, of a slice deflector for deflecting slices away from said knife, a stationary finger guard extending closely adjacent said knife and partially forwardly of the cutting edge thereof and having a portion thereof extending in substantially the same direction as the deflector, said finger guard and slice deflector having spaced openings therein, conveying means having impaling prongs thereon adapted to pass through said openings to receive the slice between said deflector and guard as the slice is formed and deflected away from the knife by said deflector, said deflector moving said slices onto said prongs and cooperating with said prongs to impale the slices in proper position thereon to be discharged from the conveyor.

7. In a slicing machine, the combination with a slicing knife, of stacking mechanism comprising a rotatable member mounted to rotate about a fixed axis, elements mounted on said member extending in a general direction to the axis of rotation of said member and spaced from said axis of rotation, a discharge fly mounted to rotate about a fixed axis adjacent the path of movement of said element and having fingers thereon extending in the general direction of the axis of rotation of said member, said fingers being arranged on said fly in staggered relation with respect to the elements on said member when said elements are adjacent said fly whereby said fingers may be aligned with the spaces between said elements and moved therebetween, means for retaining a slice on said elements after the same are formed and for conveying the slice to a position adjacent said fly, means for positioning the fly on the side of said elements away from said slice until said slice has been moved into discharge position, means for temporarily restraining the movement of said elements along their path of movement when said elements come adjacent said fingers and are arranged in proper relation to permit the fingers to move through the spaces between said elements, and means for thereafter actuating said fly to move said fingers through said spaces with said slice whereby the slice is discharged from said element.

8. A stacking mechanism for slicing machines comprising a member rotatable about a fixed axis and having slice supporting elements extending in a direction substantially parallel to the axis of rotation of said member and spaced from each other, a discharge fly located at a position adjacent the path of movement of said elements and movable about an axis substantially perpendicular to the axis of rotation of said member, said discharge fly having fingers extending substantially in the same direction as the axis of rotation of said member and spaced from each other sufficiently to permit the fingers to pass through the spaces between said elements when said elements arrive at discharge position, means for moving said fly to position said fingers between the path of movement of said elements and the axis of rotation of said member while said elements are moving into discharge position with a slice retained thereon, means for temporarily restraining the movement of said member, and means for moving said fingers between said elements while said member is so restrained whereby the rotatable movement of the slice is arrested while the fingers on the discharge fly move into engagement therewith to discharge the same in a direction substantially perpendicular to the path of movement while on said elements, said temporarily restraining means being rendered inoperative when the slice is discharged from said elements.

9. In a slicing machine, the combination with a slicing knife, of means for moving a substance into engagement with the slicing knife, and a deflector for deflecting the slices away from said knife as they are formed thereby, said deflector being releasably mounted on said slicing machine and said mounting comprising a member having ears spaced from each other in a direction substantially parallel to the cutting plane of the knife, spaced ears on said deflector having aligned openings therein, and pivot members on said first mentioned ears movable relatively toward and from each other for engaging said openings in said ears on said deflector.

10. In a slicing machine, the combination with a slicing knife, of means for moving a substance into engagement with the slicing knife, and a deflector for deflecting the slices away from said knife as they are formed thereby, said deflector being releasably mounted on said slicing machine and said mounting comprising a member having ears spaced from each other in a direction substantially parallel to the cutting plane of the knife, spaced ears on said deflector having aligned openings therein, pivot members on said first mentioned ears movable relatively toward and from each other for engaging said openings in said ears on said deflector, operating means for moving said pivot members relative to each other comprising a rotatable member secured to one of said pivot members and having a cam surface thereon cooperating with a cam surface on one of the ears on said supporting member whereby upon rotation of said operating means, the cam surfaces co-act to move said pivot members in one direction relative to each other, and yielding means for moving said pivot members relative to each other in the opposite direction.

11. In a slicing machine, the combination with a slicing knife, of means for presenting a substance to the knife so that successive slices may be severed therefrom, a stacking mechanism for receiving the slices as they are formed and for depositing them upon a receiving surface including impaling prongs upon which the slices are impaled as they are formed, a deflector for deflecting a slice away from the knife, and a guard spaced from the deflector and cooperating with said deflector to move the slices onto said prongs and prevent the improper positioning of said slices on said prongs whereby the slice will be in proper position to be discharged from said prongs when they reach the discharge position.

12. In a slicing machine, the combination of a slicing knife, of means for presenting a substance to be sliced, a rotatable conveyor to carry the slices away from said knife having slice impaling prongs thereon movable past the edge of said knife, a deflector positioned adjacent the cutting edge of said knife to deflect slices away from said knife and having openings arranged to receive the prongs as they pass away from said knife whereby the slices are moved on said prongs away from said deflector as the slices are formed, and a cooperating member having spaced openings therein for permitting passage of said prongs past said member, said cooperating member coacting with said slice deflector to position the slices on said prongs and prevent the same from being moved toward the base of said prongs to a greater extent than desired.

13. In a slicing machine, the combination of a slicing knife, of a substance carriage movable past said knife to present a substance to be sliced, means for carrying the slices away from said knife as they are formed, an impaling member having prongs thereon movable past said knife to receive the slices as they are formed, and a guard member extending substantially parallel to the cutting plane of said knife on the side thereof away from the substance support having openings therein through which said prongs may move but having a substantially continuous portion adjacent the operator's position which extends beyond the outermost path of the movement of said prongs whereby the operator's hand is prevented from engaging the prongs if it accidentally moves against said guard.

14. In a slicing machine, the combination with a slicing knife of a rotatable drum having outwardly extending impaling prongs movable to and past the cutting plane of said knife for receiving slices as they are formed and for conveying them to a discharge position adjacent the operator's side of the machine, a discharge fly movable toward the operator's position to discharge the slice from said prongs onto a receiving surface and having spaced fingers adapted to be arranged between said prongs at the discharge position before the discharge movement thereof and having a connecting portion lying outside of the path of movement of said prongs and adjacent the operator's position and also adjacent the path of movement of the substance support whereby the operator is protected by this connecting portion against injury which might otherwise be done to the operator by said prongs.

15. A device as claimed in claim 14, which includes in addition a guard member extending substantially to the cutting plane of said knife and substantially bridging the space between said connecting portion on said discharge fly and the cutting edge of said knife to protect the operator and having openings therein to permit the passage of said prongs past said guard, said guard having a continuous portion beyond the path of movement of said prongs and adjacent the operator's position to protect the operator when the discharge fly has moved outwardly from its normal position to the discharge position thereof.

16. In a slicing machine, the combination with a slicing knife of means for presenting a substance to be sliced to said knife and a conveyor for conveying the slices away from the knife after they are formed to a discharge position, said conveyor having impaling prongs thereon, and means for moving said conveyor so that the slice engaging portions of said prongs are driven at substantially the same rate of speed as the slices are formed, said driving means having a yielding connection to permit the retardation of the movement of said prongs to correspond exactly with the speed of movement of the slices to compensate for any difference between the speed of movement of the slice as formed and the speed of movement of the portions of the prongs which are to receive the slice, said yielding connection including a pair of relatively movable elements normally driven in unison with each other through a compression spring which is limited in the amount of displacement which it can cause between said elements by a stop, said stop acting only to limit the movement of said elements in one direction but permiting the spring to be compressed whereby the rate of driving said conveyor is varied when the force acts on the conveyor to compress said spring.

17. A stacking mechanism for slicing machines comprising a rotatable support, a slice conveying means for conveying slices away from the knife as they are formed, a yielding driving connection between said rotatable support and said conveying means, including a compression spring attached respectively to said rotatable support and said conveying means for urging said conveying means relative to said support in the general direction of movement of said conveying means when driven by said rotatable support, and a stop for limiting the amount of relative movement between said rotatable support and said conveying means which may be caused by said spring, said spring being compressible when a retarding effect is imparted to said conveying means without interrupting the continuous movement of said rotatable support, and said spring operating to move said conveying means back to the same operative position with respect to said rotatable support as it bore to said rotatable support prior to the time when the retarding force was applied to said conveying means.

18. In a slicing machine, the combination with a slicing knife, of means for presenting a substance to be sliced to said knife, a conveyor for conveying the slices away from said knife as they are formed, a discharge fly for discharging the slice from said conveyor when the slice reaches a discharge position, means for normally urging said fly to a discharge position, means for holding said last mentioned means inoperative until the slices reach the discharge position and for thereafter releasing said means for moving the fly to discharge position, a brake mechanism for arresting the movement of the discharge fly at the end of its discharge movement, comprising a member having a straight braking surface, an arm movable with said fly and connected thereto at a point thereon which moves in a general direction away from the braking surface and on the side of the member which is away from the side of the member which has the braking surface thereon, and a brake shoe connected to said arm and slidable along said braking surface as said discharge fly is moved about its pivot, said brake shoe moving to a position along said braking surface which is in substantially perpendicular alignment with the point of connection between said arm and said discharge fly at the end of the movement of said discharge fly to discharge position, whereby the braking force is increased rapidly near the end of the discharging movement of the discharge fly due to the fact that the force acting to pull the brake shoe against the braking surface acts substantially perpendicular to the braking surface at the end of the discharge movement of the fly.

19. In a discharge fly for stacking mechanism and the like, the combination with a pivoted discharge fly, a member having a braking surface extending in spaced relation to the pivot for said discharge fly, a brake shoe slidable along the braking surface of said member, means for connecting said brake shoe to said discharge fly comprising a link pivoted to said brake shoe and said discharge fly, the point of connection between said means and the discharge fly being movable in a direction to move the brake shoe along the braking surface of said member from a point remote from a perpendicular line between said point of connection with said discharge fly and the braking surface of said member while the discharge fly is in inoperative position to a position in which the brake shoe and the point of connection with said discharge fly are substantially on a line perpendicular to the braking surface, and means for shielding the side of said brake shoe at the places where it engages the braking surface to prevent the accumulation of lubricant and foreign material on said braking surface.

20. A device as claimed in claim 19 in which the discharge fly is moved to discharge position by a compression spring arranged within a telescoping housing, one section of said telescoping housing being pivotally connected to said discharge fly and another section of said telescoping housing having a projection thereon extending into an opening in a fixed support on said slicing machine so as to be immediately releasable therefrom when desired, said spring acting also as a means to force the brake shoe into engagement with the braking surface.

21. A device as claimed in claim 19 in which the discharge fly is moved to discharge position by a compression spring arranged within sections of a telescoping housing, one end section thereof being pivotally connected to said discharge fly and another end section thereof at the opposite end of said telescoping housing being provided with an adjustable projection extending outwardly therefrom adapted to be arranged within an opening in a stationary portion of said slicing machine and to abut against the edges of said opening to act as an adjustable point of resistance for said spring whereby the force with which the discharge fly is moved to inoperative position is readily adjustable.

22. A device as claimed in claim 18 in which a resilient bumper is provided near the end of the path of travel of the brake shoe whereby the brake shoe renders the discharge fly operable to release a slice arranged thereon in the event that the sliding movement along said brake shoe is not arrested at the usual or intended position such as when the braking surface has the coefficient of friction thereof reduced by an accumulation of lubricant or grease thereon.

23. In a slicing machine, the combination with a slicing knife, of means for presenting a substance to be sliced to said knife, a slice stacking mechanism comprising a member having outwardly extending prongs thereon movable past the cutting edge of said knife continuously in the same direction whereby successive slices may be impaled upon said prongs and carried to a discharge position, a deflector for deflecting the slices away from said knife and for impaling the slices on said prongs, a discharge fly facing the operator's position for discharging slices from said conveyor after they are arranged on said prongs and for discharging the slices toward the operator's position, a finger guard arranged closely adjacent the cutting plane of said knife and substantially bridging the space between said discharge fly and the cutting edge of said knife, having spaced openings therein to permit the passage of said prongs therethrough while at the same time preventing any substantial injury to the operator by preventing the operator from inserting his hand very far into the path of movement of said prongs as they arrive at a position between said discharge position and said knife, and a transparent guard for bridging the remaining space between the discharge fly and the deflector and being arranged on the side of the conveying means opposite to said finger guard whereby the conveying means is at all times substantially enclosed within a guard wall without interfering with the operation thereof.

24. In a slicing machine, the combination with a supporting frame, of a knife mounted on said frame with the lower edge thereof spaced from the frame in the plane of the knife sufficient to permit the insertion of a scrap pan therebeneath, means for presenting substances to be sliced to said knife, and a scrap pan arranged beneath said knife having a handle extending in a general direction of the length of the scrap pan and the cutting plane of said knife, the end of said handle being reversely bent and adapted to be received within an opening in said frame, said frame being provided with an opening of a size sufficient to prevent lateral shifting movement of said handle when the end of said handle is within said opening for receiving said reversely bent portion when the scrap pan is in its operative position whereby the scrap pan is located in its operative position and at the same time held in that position.

25. A stacking mechanism for slicing machines comprising a rotatable support, a segmental drum portion having outwardly projecting slice engaging prongs thereon, a spindle on said support and a bearing on said drum surrounding said spindle, a driving connection between said support and said drum automatically disconnectable and connectable when said drum is slid off and onto said spindle respectively by an endwise movement thereof, and a releasable detent for normally preventing the movement of said drum off said spindle, said driving connection between said support and drum being an operative driving connection for causing said drum and support to move in unison with each other.

26. A stacking mechanism for slicing machines comprising a rotatable support, a segmental drum portion having outwardly projecting slice engaging prongs thereon, a spindle on said support, a bearing on said drum surrounding said spindle, a driving connection between said support and said drum automatically disconnectable and connectable when said drum is slid off and onto said spindle respectively by an endwise movement thereof, a releasable detent for normally preventing the movement of said drum off said spindle, said driving connection between said support and drum being an operative driving connection for causing said drum and support to move in unison with each other, and a yielding driving connection for driving said support.

27. In a stacking mechanism for slicing machines, the combination with a rotatable spindle carrying the slice conveying means, of a cam on said spindle secured thereto and having the cam surface thereof facing in a direction parallel to the axis of said spindle, said cam surface having a portion thereof extending substantially parallel to the axis of said spindle, a discharge fly for discharging slices from said conveyor, means for actuating said fly comprising an arm pivoted to said fly, having a cam engaging portion thereon in contact with the surface of said cam, means for urging said cam engaging portion of said arm into contact with said cam at all times, said spindle being normally driven in a direction of rotation such that the cam engaging portion of said arm moves over the surface of said cam and in a direction away from the cam surface which extends substantially parallel to said spindle, means for preventing rotating movement of said arm while said cam is moving in the proper direction comprising a rigid abutment for limiting the arm movement, and a spring for yieldingly holding the arm in engagement with said abutment whereby as said cam is rotated in the direction opposite to that intended the arm can yield in the event the same is brought into engagement with said surface which extends substantially parallel to said spindle and to prevent damage to said arm and discharge operating mechanism.

28. A stacking mechanism for slicing machines comprising a rotatable support, a slice conveying means for conveying slices away from the knife as they are formed, a yielding driving connection between said rotatable support and said conveying means, including a spring attached respectively to said rotatable support and said conveying means for urging said conveying means relative to said support in the general direction of movement of said conveying means when driven by said rotatable support, and a stop for limiting the amount of relative movement between said rotatable support and said conveying means which is caused by said spring, said spring having energy stored therein when a retarding effect is imparted to said conveying means without interrupting the continuous movement of said rotatable support and being thereafter operative to move said conveying means back to the same operative position with respect to said rotatable support as it bore to said rotatable support prior to the time when the retarding force was applied to said conveying means.

29. In a slicing machine, the combination with a slicing knife, of means for presenting a substance to be sliced to said knife, a conveyor for conveying the slices away from the knife after they are formed to a discharge position, said conveyor having impaling prongs thereon, and means for moving said conveyor so that the slice engaging portions of said prongs are driven at substantially the same rate of speed as the slices which are formed, said driving means having a yielding connection to permit the retardation of the movement of said prongs to correspond exactly with the speed of movement of the slices to compensate for any difference between the speed of movement of the slice as formed and the speed of movement of the portions of the prongs which are to receive the slice, said yielding connection including a pair of relatively movable elements normally driven in unison with each other through the intermediacy of a spring which is limited in the amount of displacement which it can cause between said elements, by a stop which acts only to limit the movement of said elements in one direction but permits movement of said elements in the opposite direction and stores energy in said spring during said last mentioned relative movement, whereby the rate of driving said conveyor is varied when the force acts on the conveyor to store energy in said spring.

30. Slicing machines provided with stacking mechanism comprising a member adapted to be arranged forwardly of the cutting edge of the knife and having a plurality of fingers thereon adapted to extend between impaling prongs on a stacking mechanism and having a substantially continuous portion joining said fingers adapted to occupy a position between the operator's position and the stacking mechanism of a slicing machine whereby to protect the operator.

31. In a slicing machine, the combination with a slicing knife, of a stacking mechanism including a rotatable member having slice impaling prongs protruding from the surface thereof, means for moving said member to periodically move said prongs past and closely adjacent the cutting edge of said knife so that said prongs will engage and convey a slice away from the cutting edge of said knife to a discharge position, and means for positioning the slices as they are formed on said prongs in spaced relation to said member comprising a pair of guides arranged on opposite sides of the path of movement of said slice, one of said guides deflecting the slices away from the cutting edge of said knife and forcing the slices onto said prongs, and the other of said guides engaging the slice and preventing movement of said slice toward the bases of said prongs more than a predetermined amount, whereby a discharge fly may be positioned between the slice and said member as said slice arrives at a discharge position.

32. In a slicing machine having a base, the combination with a slicing knife mounted on the base, of a table movable relative to the knife, a support, stacking means on said support for receiving and stacking slices as they are severed, an adjustable connection between the support and base whereby the support is slidable in a direction towards and away from the cutting edge of the knife and substantially parallel to the cutting plane of the knife to position the stacking mechanism in proper operative relation to the cutting edge of the knife to compensate for different knife diameters or for wearing away of the knife, and means for holding the support in adjusted position.

33. In a slicing machine having a base, the combination with a slicing knife mounted on the base, of a table movable relative to the knife, a support, a slice impaler and a slice removing fly cooperating with said impaler on said support for receiving and stacking slices as they are severed, and an adjustable connection between the support and base whereby the support is slidable in a direction towards and away from the cutting edge of the knife and substantially parallel to the cutting plane of the knife to position the fly and impaler in proper operative relation to the cutting edge of the knife to compensate for different diameters or for wearing away of the knife, and means for holding the support in adjusted position.

34. In a slicing machine having a base, the combination with a slicing knife mounted on the base, of a table movable relative to the knife, a support, a rotary mounted slice impaler, a pivotally mounted slice removing fly, cooperating with said impaler and a slice deflector adjacent the knife, said impaler, fly and detector mounted on said support for receiving and stacking slices after they are cut, means for adjustably shifting the support in respect to said base in a direction substantially parallel to the cutting plane of the knife to position the deflector, impaler and fly in proper operative relation to the cutting edge of the knife to compensate for different knife diameters or for wearing away of the knife, and means for holding the support in adjusted position.

35. In a slicing machine comprising stacking mechanism adapted to throw slices laterally and downwardly, a slice receiving surface comprising a flat plate for receiving said slices, and clamping means arranged at the periphery of said plate and having a portion thereof formed to engage the plate and hold the plate in position and a vertical extension thereon extending a substantial distance above the top surface of the plate to hold paper thereon and prevent movement of said paper on said plate during the operation of the stacking mechanism which normally creates a draft during operation and tends to shift the paper on the plate.

36. In a discharge means for slicing machines, the combination of continuously driven slice impaling means movable in but one direction and having slice receiving elements extending in spaced relation with respect to each other, and a discharge fly having fingers thereon movable between said elements when said elements arrive at the discharge position, and stop means on the slice impaling means and discharge fly for temporarily restraining the movement of said slice impaling means while said fingers are moving between said elements to discharge a slice from said elements, the restraining of the movement being for a short period of time approximately sufficient to permit said fingers to pass between said elements and out of the path of movement of said elements.

37. In a slicing machine, a pronged rotary slice impaling member positioned at one side of a cutting knife, a pair of spaced upright supports having vertical grooves formed therein, a flexible transparent guard member arranged in said grooves and slidable therein for easy insertion or removal, and upper and lower members connected to said uprights and engageable with the flexible member to hold the member in bowed position to prevent the flexible member from coming in contact with the rotary impaling member.

38. In a slicing machine, the combination of stacking mechanism including a rotary drum, of a slicing knife for severing slices from a substance, impaling prongs on said drum for receiving slices as they are severed and for conveying the same to a discharge position, and spaced guiding members engaging opposite faces of a slice as it is severed for properly positioning the slice on said impaling prongs, one of said guiding members being positioned closer to the axis of the drum than the other of said guiding members to prevent a slice from being impaled too far, the guiding member closer to the axis having spaced fingers between which the prongs pass.

39. A scrap pan for slicing machines comprising a receptacle adapted to be inserted beneath a knife from the operator's side of the machine, a long handle having one end fixed to the receptacle, the other end of the handle being provided with a spaced portion receivable in a recess formed in the slicing machine frame, said handle providing a stop to limit the movement of the receptacle when being positioned, said handle also positioning the receptacle with respect to the knife and holding the receptacle in position.

WILHELMUS ADRIANUS van BERKEL.